US012764709B2

(12) United States Patent
Hasegawa et al.

(10) Patent No.: US 12,764,709 B2
(45) Date of Patent: Oct. 13, 2026

(54) METHODS FOR RELIABLE AI/ML BASED POSITIONING

(71) Applicant: InterDigital Patent Holdings, Inc., Wilmington, DE (US)

(72) Inventors: Fumihiro Hasegawa, Westmount (CA); Yugeswar Deenoo Narayanan Thangaraj, Chalfont, PA (US); Moon IL Lee, Melville, NY (US); Shahab Hamidi-Rad, Sunnyvale, CA (US); Kunjan Shah, London (GB); Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 191 days.

(21) Appl. No.: 18/902,124

(22) Filed: Sep. 30, 2024

(65) Prior Publication Data

US 2026/0095880 A1 Apr. 2, 2026

(51) Int. Cl.
*H04W 64/00* (2009.01)
*H04L 5/00* (2006.01)

(52) U.S. Cl.
CPC ........... *H04W 64/00* (2013.01); *H04L 5/0048* (2013.01)

(58) Field of Classification Search
CPC ............................. H04W 64/00; H04L 5/0048
(Continued)

(56) References Cited

U.S. PATENT DOCUMENTS

2024/0114477 A1* 4/2024 Yerramalli ............. G06N 20/00
2024/0426966 A1* 12/2024 Hirzallah .............. G01S 5/0045
(Continued)

FOREIGN PATENT DOCUMENTS

EP 4668825 A1 12/2025
WO 2023212224 A2 11/2023
(Continued)

OTHER PUBLICATIONS

Third Generation Partnership Project (3GPP), "Stage 2 functional specification of User Equipment (UE) positioning in NG-RAN", Technical Specification Group Radio Access Network; NG Radio Access Network (NG-RAN); Release 18, 3GPP TS 38.305 V18.1.0, Mar. 2024, 182 pages.
(Continued)

*Primary Examiner* — Michael R Neff
(74) *Attorney, Agent, or Firm* — Flaster Greenberg, P.C.

(57) ABSTRACT

A wireless transmit/receive unit (WTRU) may receive, from a server associated with a trained artificial intelligence/machine leaning (AI/ML) model, a first association information. The first association information may comprise a first set of positioning reference signal (PRS) configurations on which the AI/ML model has been trained. The WTRU may receive a request for inferences related to a location of the WTRU via the AI/ML model. The WTRU may send a request for a second association information which may comprise a second set of PRS configurations. The WTRU may determine, by comparing the first and the second association information, the consistency between the first and the second association information based on PRS configurations of the first set of PRS configurations overlapping with PRS configurations of the second set of PRS configurations. The WTRU may implement the trained AI/ML model to generate inferences related to the location of the WTRU.

20 Claims, 13 Drawing Sheets

(58) Field of Classification Search
USPC ........................................................ 455/456.1
See application file for complete search history.

(56) References Cited

U.S. PATENT DOCUMENTS

| | | | | |
|---|---|---|---|---|
| 2025/0131356 | A1* | 4/2025 | Monson | G06F 40/40 |
| 2025/0142291 | A1* | 5/2025 | Thomas | H04W 24/02 |
| 2025/0142512 | A1* | 5/2025 | Hirzallah | G01S 11/02 |
| 2025/0300900 | A1* | 9/2025 | Shah | G01S 5/0273 |
| 2026/0088920 | A1* | 3/2026 | Rajendran | G06N 3/08 |

FOREIGN PATENT DOCUMENTS

| | | | |
|---|---|---|---|
| WO | 2024020086 | A1 | 1/2024 |
| WO | 2024172466 | A1 | 8/2024 |

OTHER PUBLICATIONS

R1-2406354, "Specification support for AI/ML-based positioning", CATT, CICTCI, Aug. 19-23, 2024, 22 pages.

* cited by examiner

100

METHODS FOR RELIABLE AI/ML BASED POSITIONING

BACKGROUND

An artificial intelligence/machine learning (AI/ML) model may be trained, during a training phase, using measurements obtained from received downlink reference signal (DL-RS) and/or ground truth (e.g., wireless transmit/receive unit (WTRU) locations). When the user equipment (UE), also referred to as a wireless transmit/receive unit (WTRU), uses the trained AI/ML model, the received DL-RS may be transmitted from the network under the same condition as in the training phase. Otherwise, inconsistency compared to the training phase occurs an/or the outcome of the AI/ML model may not be accurate and/or reliable.

SUMMARY

A wireless transmit/receive unit (WTRU) may receive, from a server associated with a trained artificial intelligence/machine leaning (AI/ML) model, a first association information. The first association information may comprise a first set of positioning reference signal (PRS) configurations on which the AI/ML model has been trained. The WTRU may receive, from a network entity, a request for one or more inferences related to a location of the WTRU via the AI/ML model. The WTRU may send, to the network entity, a request for a second association information. The WTRU may receive the second association information. The second association information may comprise a second set of PRS configurations. The WTRU may determine, by comparing the first and the second association information, the consistency between the first and the second association information based on a number of PRS configurations of the first set of PRS configurations overlapping with a number of PRS configurations of the second set of PRS configurations. The WTRU may implement, based on the determined consistency between the first and the second association information, the trained AI/ML model to generate one or more inferences related to the location of the WTRU. The WTRU may determine a feedback value based on the one or more inferences related to the location of the WTRU. The WTRU may send a report, wherein the report comprises the feedback value.

The first set of PRS configurations may comprise a first set of transmit/reception points (TRPs) and/or the second set of PRS configurations may comprise a second set of TRPs. The WTRU may receive a timestamp associated with the first or the second association information. The network entity may update the timestamp when a TRP is added or removed from the first and/or second sets of TRPs.

The WTRU may determine that the consistency between the first and second association information is partially consistent based on a portion of the number of PRS configurations of the first set of PRS configurations overlapping with a portion of the number of PRS configurations of the second set of PRS configurations. The WTRU may determine that the consistency between the first and second association information is fully consistent based on each of the number of PRS configurations of the first set of PRS configurations overlapping with each of the number of PRS configurations of the second set of PRS configurations. The WTRU may determine that the consistency between the first and second association information are not consistent based on none of the number of PRS configurations of the first set of PRS configurations overlapping with the number of PRS configurations of the second set of PRS configurations.

The feedback value may comprise a first feedback value. The WTRU may generate a second feedback value based on a fallback method that does not use the trained AI/ML model due to the first and second association information determined to be not consistent. The WTRU may receive, from the network, an instruction to perform a consistency check. The WTRU may then perform the consistency check between the first association information and the second association information based on the instruction. The WTRU may receive, from the server, the trained AI/ML model.

DETAILED DESCRIPTION

Figure 1A:
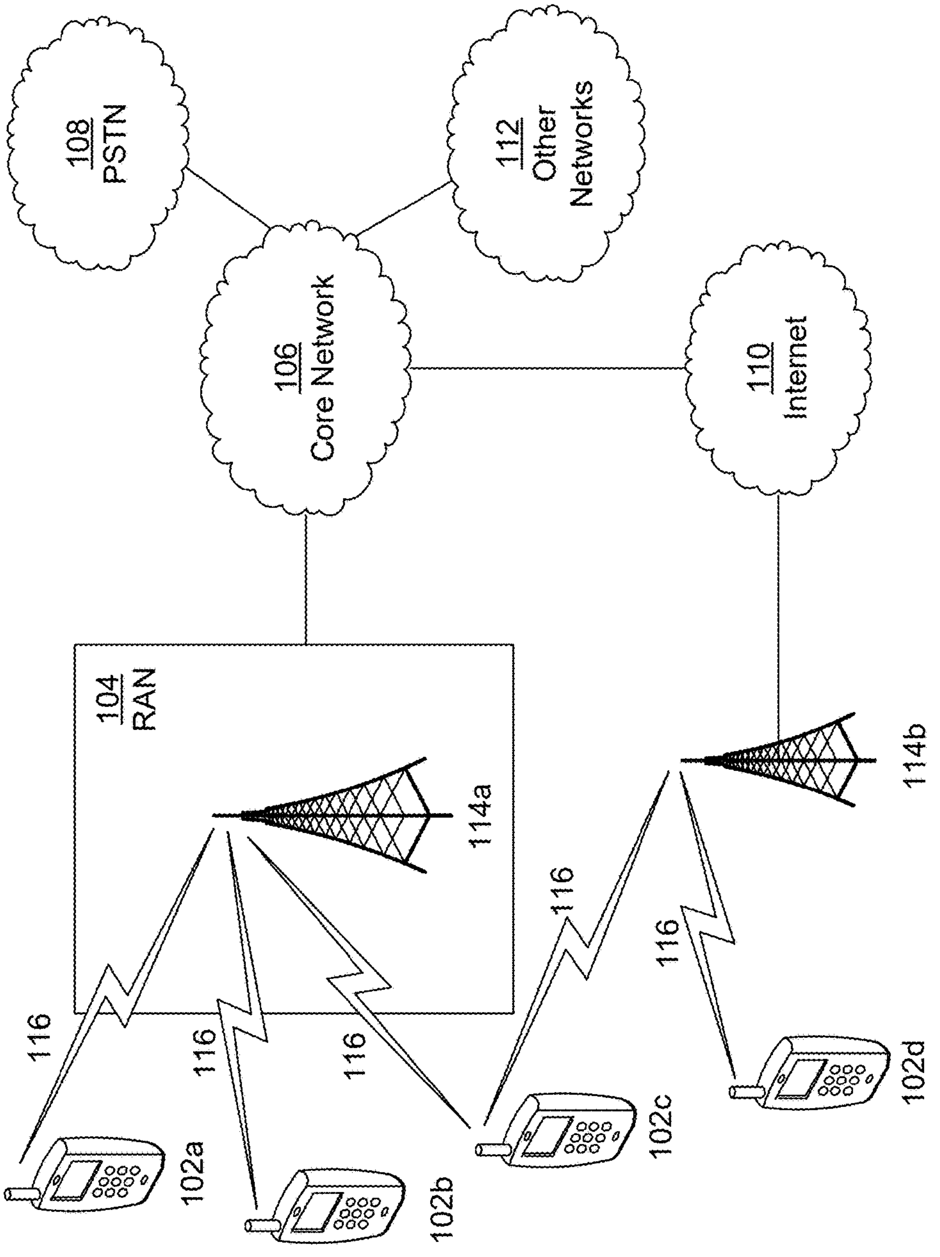
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
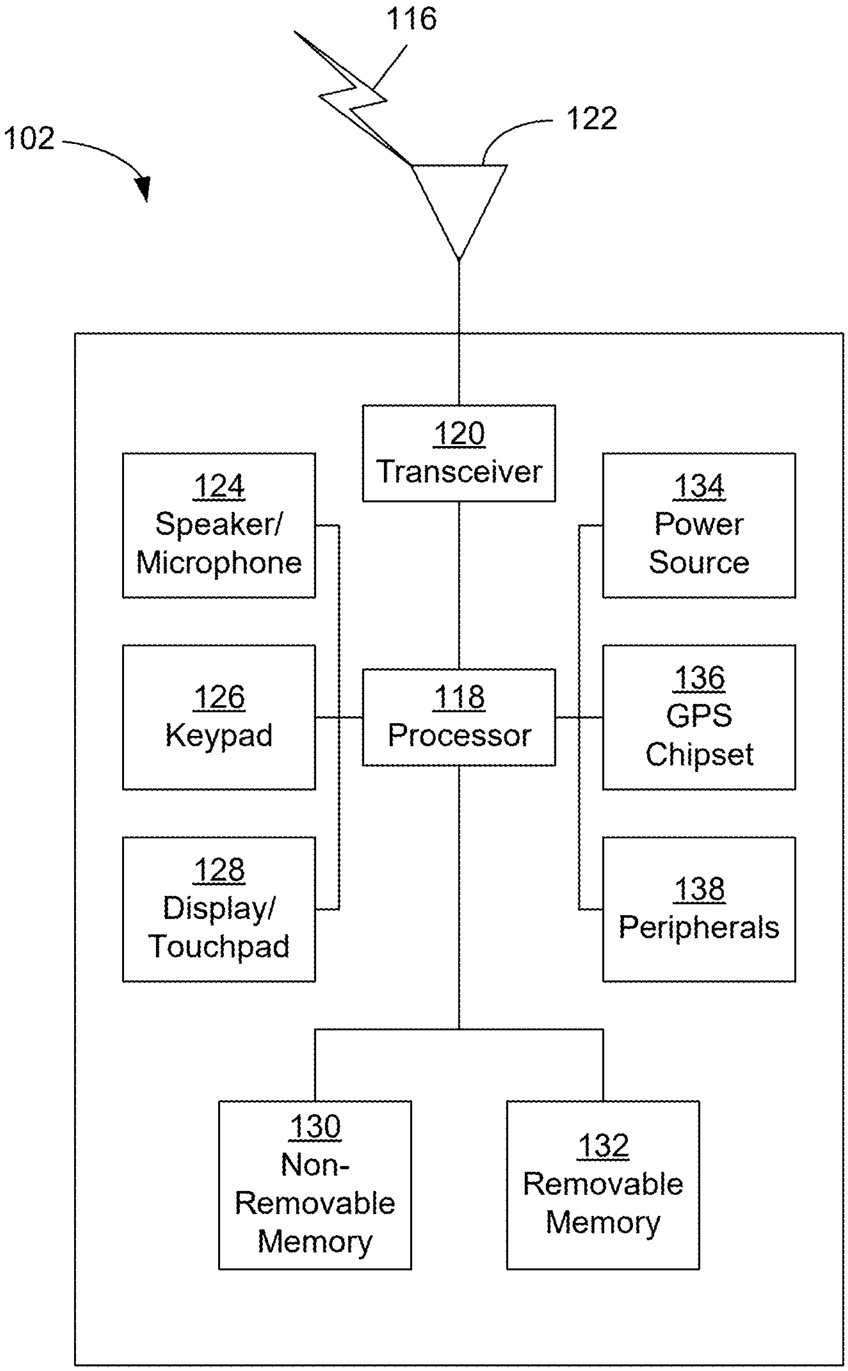
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
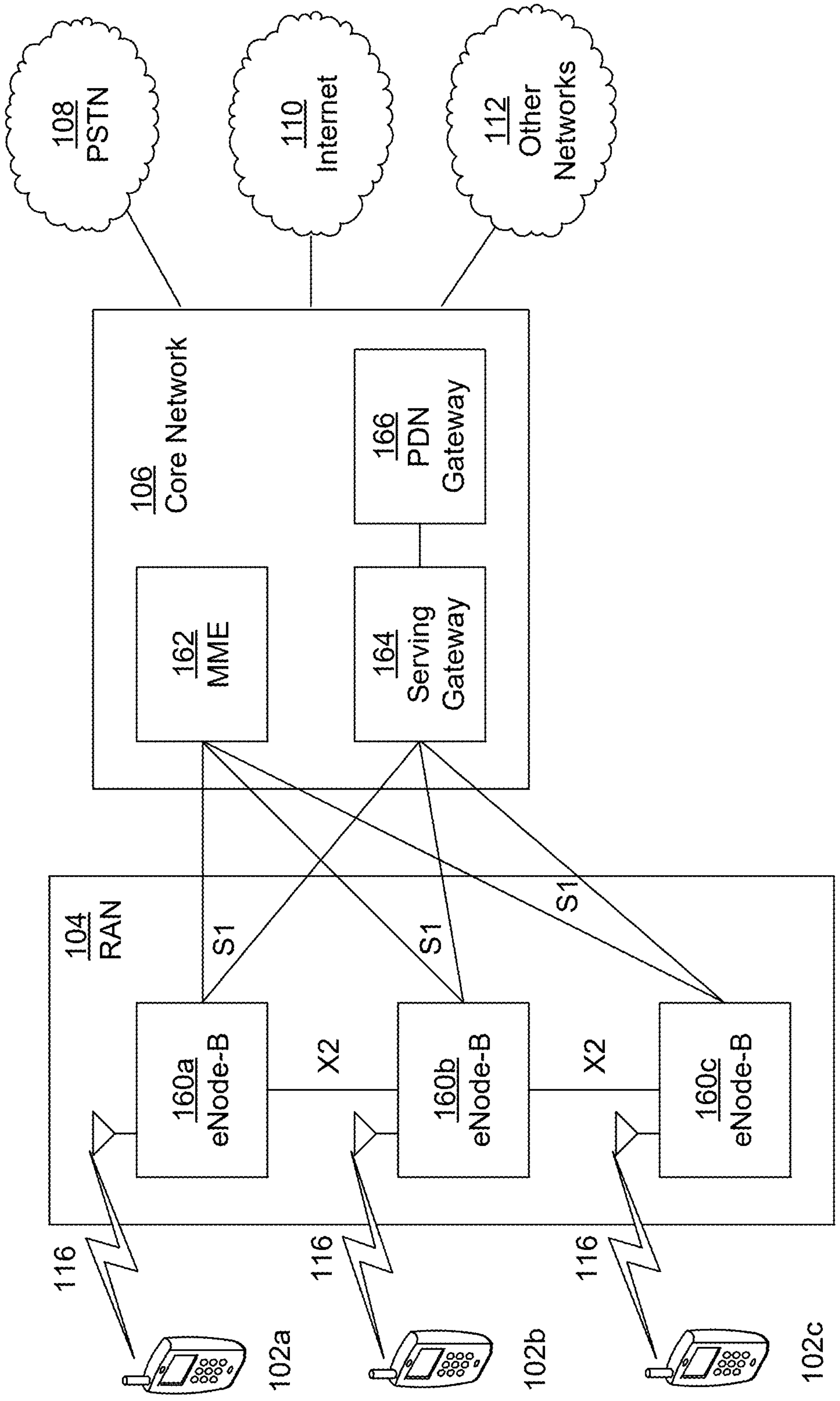
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
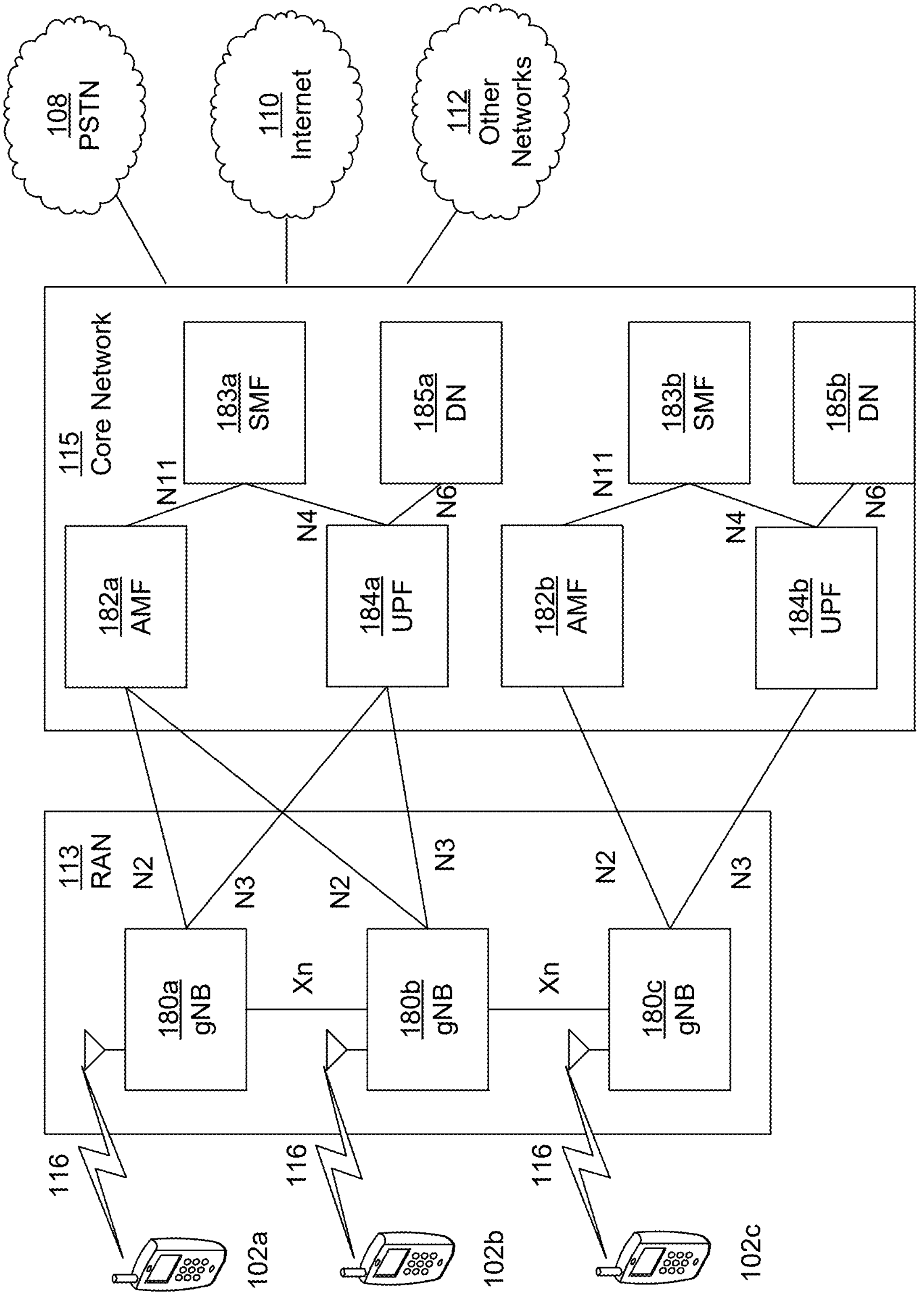
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The WTRU may receive association information from the network. The association information may include positioning reference signal (PRS) configurations (e.g., transmission-reception point, or transmission-receive point (TRP) identifiers (IDs) that will remain consistent. The association information may also include a timestamp.

Based on timestamp and/or content of association information, the WTRU may determine consistency in the network side additional conditions between data collection and inference phase (e.g., fully consistent, partially consistent, or no consistency). Based on determined consistency, the WTRU may determine whether or not to generate inference.

An explicit ID may be assigned to association. More than one ID may be associated with a PRS configuration (e.g., frequency layer, TRP). The WTRU may determine consistency in network side additional conditions based on the IDs associated with a PRS configuration.

The WTRU may send a request to the network for configuration (e.g., downlink reference signal (DL-RS) configurations and/or uplink reference signal (UL-RS) configurations) in physical uplink shared channel (PUSCH), physical uplink control channel (PUCCH), uplink control information (UCI), medium access control element (MAC-CE), radio resource control (RRC) and/or long term evolution (LTE) positioning protocol (LPP) message. The request from the WTRU may include configurations of a measurement gap, DL-RS processing window, and/or window for transmission of UL-RS.

The WTRU may send an acknowledgement message in PUSCH and/or PUCCH for the grant received from the network. More than one condition and/or criteria may be used in a combination. The WTRU may be configured with more than one conditions and/or associated WTRU behavior. The WTRU may determine which behavior the WTRU uses based on the applicable condition.

The WTRU may measure DL-RS inside and/or outside of the active bandwidth part (BWP). The WTRU may transmit UL-RS inside and/or outside of active BWP.

The WTRU may be preconfigured with parameters (e.g., measurement gaps, DL-RS processing windows, DL-RS configurations, and/or UL-RS configurations) via a semi-static message (e.g., LPP and/or RRC).

The network may configure any actions the WTRU takes. For example, the WTRU may be configured with a rule. According to the rule, the WTRU may take an associated action.

In addition to the measurements made on DL-RS, the WTRU may include at least one of the following cell-related measurements: synchronization signal block (SSB) reference signal received power (RSRP) from the serving cell with corresponding cell ID; SSB RSRP from the neighboring cell(s) with corresponding cell ID(s); RSRP of channel state information reference signal (CSI-RS) with CSI-RS resource ID; and/or RSRP of the demodulation reference signal (DM-RS).

Herein, “network” may include an application management function (AMF), location management function (LMF), gNodeB (gNB), and/or net generation radio access network (NG-RAN). “Pre-configuration” and “configuration” may be used interchangeably in this disclosure. “Non-serving gNB” and “neighboring gNB” may be used interchangeably in this disclosure. “gNB” and “TRP” may be used interchangeably in this disclosure. “DL-RS” and “DL-RS resource” may be used interchangeably in this disclosure. However, “DL-RS(s)” and “DL-RS resource(s)” may belong to different DL-RS resource sets. “Measurement gap” and “Measurement gap pattern” may be used interchangeably in this disclosure. “Measurement gap pattern” may include parameters such as measurement gap duration, measurement gap repetition period and/or measurement gap periodicity. In the examples described herein, “ID” and “index” may be used interchangeably.

An LMF is a non-limiting example of a node or entity (e.g., network node and/or entity) used for or to support positioning and/or sensing. Any other node and/or entity may be substituted for LMF and still be consistent with this disclosure. The WTRU may receive a preconfigured threshold(s) from the network (e.g., LMF and/or gNB).

The LOS indicator may be a hard indicator (e.g., 1 or 0) or soft indicator (e.g., 0, 0.1, 0.2 . . . , 1). The LOS indicator may indicate the likelihood of the presence of an LOS path between TRP and/or WTRU or along DL-RS. The LOS indicator may be associated with a TRP and/or PRS resource ID (e.g., index). The WTRU may receive the LOS indicator from the network per TRP and/or resource ID. Alternatively, the WTRU may determine the LOS indicator per TRP and/or resource ID based on measurements.

For example, a WTRU location may be expressed in terms of altitude, latitude, geographic coordinate, and/or local coordinate. In the examples described herein, a timestamp may be indicated by absolute time, relative time (e.g., in seconds) compared to a reference time, system frame number (SFN), slot index, frame index, subframe index and/or symbol index. Examples of “absolute time” may be coordinated universal time (UTC) time, global navigational satellite system (GNSS) time, locally defined absolute time (e.g., LTE and/or NR Time).

In examples, the WTRU may receive DL-RS and/or UL-RS (e.g., sounding reference signal (SRS)) configurations for positioning purpose from the network (e.g., LMF). The LMF may forward the PRS configuration and/or SRS configurations to the gNB. This way, the gNB may schedule PRS transmission and/or SRS reception at the TRP, transmission point (TP) and/or reception or receive point (RP)

In an example, a DL-RS configuration may include at least one of the following parameters: number of symbols, transmission power, number of DL-RS resources included in DL-RS resource set, muting pattern for DL-RS (e.g., the muting pattern may be expressed via a bitmap), periodicity, type of DL-RS (e.g., periodic, semi-persistent, and/or aperiodic), slot offset for periodic transmission for DL-RS, vertical shift of DL-RS pattern in the frequency domain, time gap during repetition, repetition factor, RE (resource element) offset, comb pattern, comb size, spatial relation (e.g., with respect to other DL-RSs or UL-RSs such as SRS for positioning purpose), quasi-colocation (QCL) information (e.g., QCL target, and/or QCL source) for DL-RS, number of TRPs, absolute radio-frequency channel number (ARFCN), subcarrier spacing, expected RSTD, uncertainty in expected reference signal time difference (RSTD), start physical resource block (PRB), bandwidth, BWP ID, number of frequency layers, start/end time for DL-RS transmission, on/off indicator for DL-RS, TRP ID, DL-RS ID, cell ID, global cell ID, and/or applicable time window. The WTRU may apply a DL-RS configuration under a condition that the current time is within the applicable time window. “ID” may be used interchangeably with “index”. Examples of DL-RS are CSI-RS, phase tracking reference signal (PTRS), positioning reference signal (PRS), tracking reference signal (TRS), and SSB.

In another example, UL-RS and/or SRS configuration may include at least one of: resource ID; comb offset values, cyclic shift values; start position in the frequency domain; number of UL-RS symbols; shift in the frequency domain for UL-RS; frequency hopping pattern; type of UL-RS (e.g., aperiodic, semi-persistent, and/or periodic); sequence ID used to generate UL-RS, or other IDs used to generate UL-RS sequence; spatial relation information, indicating which reference signal (e.g., DL RS, UL RS, CSI-RS, SRS, and/or DM-RS) or SSB (e.g., SSB ID and/or cell ID of the SSB) the UL-RS is related to spatially where the UL-RS and/or DL-RS may be aligned spatially; QCL information (e.g., a QCL relationship between UL-RS and/or other reference signals or SSB); QCL type (e.g., QCL type A, QCL type B, QCL type C, and/or QCL type D); resource set ID; list of UL-RS resources in the resource set; transmission power related information; pathloss reference information which may contain index for SSB, CSI-RS or DL-RS; periodicity of UL-RS transmission; and/or spatial information such as spatial direction information of UL-RS transmission (e.g., beam information, angles of transmission), spatial direction information of DL RS reception (e.g., beam ID used to receive DL RS, angle of arrival). As discussed above, "ID" may be used interchangeably with "index". Examples of UL-RS may include SRS and/or SRS for positioning purpose.

Categories of WTRU positioning techniques may be described herein. For example, a "DL positioning method" may refer to any positioning method that uses downlink reference signals such as PRS. The WTRU may receive multiple reference signals from TP(s). The WTRU may measure DL RSTD and/or RSRP. Examples of DL positioning methods may include downlink angle of departure (DL-AoD) and/or downlink time difference of arrival (DL-TDOA) positioning.

An "UL positioning method" may refer to any positioning method that uses uplink reference signals such as SRS for positioning. The WTRU may transmit SRS to multiple RPs and/or the RPs measure the uplink relative time of arrival (UL RTOA) and/or RSRP. Examples of UL positioning methods may include uplink time difference of arrival (UL-TDOA) or uplink angle of arrival (UL-AoA) positioning.

A "DL and UL positioning method" may refer to any positioning method that uses both uplink and downlink reference signals for positioning. For example, a WTRU may transmit SRS to multiple TRPs and/or gNB measures the reception-transmission (Rx-Tx) time difference. This Rx-Tx time difference may be calculated based on the time of arrival of DL-RS (e.g., PRS). The gNB may measure RSRP for the received SRS. The WTRU may measure Rx-Tx time difference for PRS transmitted from multiple TRPs. The WTRU may measure RSRP for the received PRS. The Rx-TX difference and/or RSRP may be measured and used by the WTRU and/or gNB to compute round trip time. Here the term "WTRU Rx-Tx time difference" may refer to the difference between arrival time of the reference signal transmitted by the TRP and the transmission time of the reference signal transmitted from the WTRU. An example of the DL and/or UL positioning method is multi-round trip time (RTT) positioning.

The WTRU may receive configuration for measurement gaps for making measurements on PRS outside of the active BWP. The WTRU may receive PRSs outside of the active BWP from outside of the serving cell.

The WTRU may send a request based on measurements. In one example, the WTRU may transmit a request to the gNB (e.g., serving gNB), for example, via MAC-CE and/or UCI to change measurement gap configuration. The WTRU may send (e.g., determine to send) the request based on the measurement status (e.g., quality and/or value) of one or more PRS resource(s). The WTRU may receive a PRS configuration from, for example, the LMF. The PRS configuration may be received via signalling such as LPP signalling (e.g., LPP messages). The WTRU may initially send a request to (e.g., to the gNB) to configure measurement gap(s).

The WTRU may receive configurations related to a measurement gap from the network. The configuration of measurement gap(s) may comprise a configuration of a measurement gap parameters. These measurement gap parameters may include measurement gap length, gap periodicity, and/or gap offset. The WTRU may make the request so that the WTRU can measure on PRS from one or more serving gNBs and/or non-serving gNBs.

Figure 2:
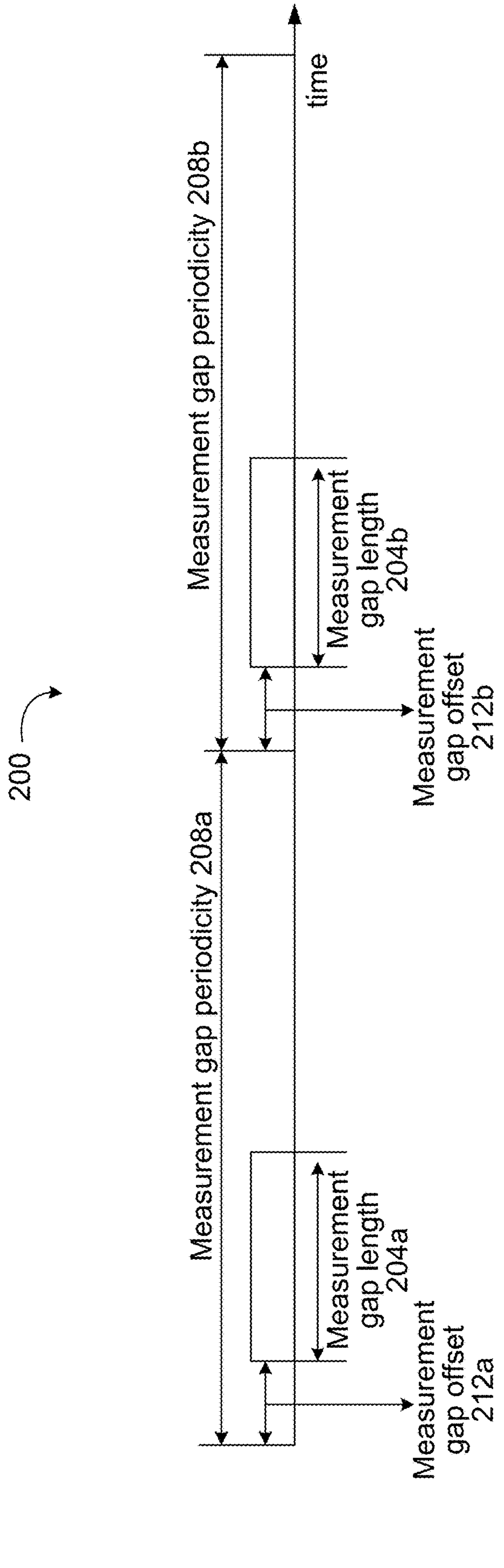
FIG. 2 is a diagram depicting measurement gap periodicity, measurement gap length, and/or measurement gap offset.

Parameters related to measurement gap, namely, measurement gap length 204$a$-$b$, measurement gap periodicity 208$a$-$b$, and measurement gap offset 212$a$-$b$ are illustrated in the diagram 200 of FIG. 2. During the measurement gap, whose length is indicated as measurement gap length 204$a$-$b$ in FIG. 2, the WTRU may not be expected to transmit or receive data. Outside of the measurement gap, the WTRU may be expected to make measurements on PRS(s).

A WTRU may be configured with (or receive configuration of) one or more thresholds, one or more time windows, and/or one or more durations for determining when to request a measurement gap configuration (e.g., pattern) and/or a measurement gap configuration (e.g., pattern) update and/or change. The threshold(s), the time window(s), and/or duration(s) may be received from a gNB (e.g., the serving gNB) and/or the LMF.

RSTD may be defined by the difference in time of arrival between PRSs transmitted from a reference TRP and a target TRP. The WTRU may be configured with the reference TRP index, the target TRP index, and/or the PRS resource indices to make measurements. The WTRU may determine the time of arrival from TRP based on one or more PRS resources associated with the TRP. In another example, the RSTD may be defined as the difference in time of arrival between the reference PRS transmitted from a TRP and the target PRS transmitted from a TRP.

"WTRU Rx-Tx time difference" may refers to the difference between arrival time of the reference signal transmitted by the TRP and transmission time of the reference signal transmitted from the WTRU. The WTRU Rx-Tx time difference may be associated with PRS resource ID and/or SRSp resource ID.

Reference signal carrier phase (RSCP) may be defined as the carrier phase measurement on the PRS. RSCP difference (RSCPD) may be defined as the difference in carrier phase measurements between two PRS resources.

In another example, RSRP per path may be defined as the RSRP per path if the WTRU observer a multipath channel in the measurement. The WTRU may determine RSRP for a DL RS resource. RSRP and/or reference signal received path power (RSRPP) may be reported using units dBm and/or relative power difference compared to a reference (e.g., RSRP of the first path, in dB).

An example of measurement may be a channel impulse response. A channel impulse response, comprising N paths, may be defined by the following equation:

$$h(t)=\sum_{k=1}^{N}h_k(t)\delta(t-\tau_k)$$

where $h_k(t)$ and $\tau_k$ are time-varying complex valued coefficient (e.g., expressed by a+bj where $j=\sqrt{-1}$) for the channel impulse response and delay, measured in seconds, for the $k^{th}$ path, respectively. The delta function is defined as $\delta(t)=1$ for t=0 and $\delta(t)=0$ for $t\neq 0$.

The coefficients may be constant over time, (e.g. $h_k(t)=h_k$). The WTRU may report $h_k$ and $\tau_k$ for each path k to the network. The WTRU may report the number of paths, N, to the network. Additionally or alternatively, the WTRU may receive $h_k$ and/or $\tau_k$ for each path k from the network and/or the number of paths.

The WTRU may obtain the channel impulse response (CIR) from the network. The network may indicate PRS configuration(s) such as PRS resource IDs associated with the CIR. For example, the CIR may be associated with PRS resource ID. In this case, the WTRU may determine that the CIR is derived based on the measurements made on the PRS resource associated with the ID. Additionally or alternatively, the WTRU may determine that the channel along the direction of transmission of the PRS and/or reception of the PRS corresponds to the CIR.

The CIR may be associated with a TRP ID. In this case, the WTRU may determine that the CIR represents the channel between the associated TRP and/or WTRU. The CIR may be associated with more than one TRPs where the network may include TRP indices associated with the CIR. The CIR may be associated with a cell. In this case, the WTRU may receive cell ID or index associated with the CIR from the network. The CIR may be associated with more than one TRPs and/or PRS resource IDs. In this case, the WTRU may determine that the channel between the TRPs and the WTRU corresponds to the CIR. Additionally or alternatively, the WTRU may determine that the channel along the transmission directions of PRSs associated with IDs or reception directions of the PRS correspond to the CIR. More than one CIRs may be associated with one parameter from PRS configurations (e.g., TRP ID, PRS resource ID, and/or frequency layer ID). For example, the WTRU may receive information related to two CIRs associated with a TRP from the network, e.g., $$h_1(t)=\sum_{k=1}^{N_1}h_{1,k}(t)\delta(t-\tau_{1,k})\text{ and }h_2(t)=\sum_{k=1}^{N_2}h_{2,k}(t)\delta(t-\tau_{2,k})$$

from the network. Alternatively, the WTRU may report information related to more than one CIRs associated with PRS configuration (e.g., TRP ID and/or PRS resource ID) based on the measurements to the network. More than one CIR may be associated with PRS configuration. This can occur since the WTRU and/or network may observe different channel characteristics based on AoA of DL RS and/or UL RS, for example.

CIR may be represented by delay profile and/or power delay profile. A power delay profile may be defined as a set of delays and/or power profiles, such as $[\tau_0, \tau_1, \ldots, \tau_{N-1}]$ and $[p_0, p_1, \ldots, p_{N-1}]$, where $p_k$ may correspond to relative power at the $k^{th}$ path compared to the first path. A delay profile may be defined as a set of delays $[\tau_0, \tau_1, \ldots, \tau_{N-1}]$ which indicates path delay for each path above $p_{threshold}$. The WTRU may receive $p_{threshold}$ from the network to derive delay profile from power delay profile.

The WTRU may receive an indication from the network on how to generate CIR, power delay profile (PDP), and/or delay profile (DP) based on timing, phase, and/or power measurements. The WTRU may send a request to the network to receive methodologies to generate CIR, PDP, and/or DP. These methodologies may be based on the measurements made by the WTRU. For example, the WTRU may receive a message from the network (e.g., via LPP, RRC, MAC-CE, and/or DCI) indicating the PRS resource indices and/or associated measurement type(s) (e.g., RSTD and/or AOA) to generate CIR, PDP, and/or DP. The WTRU may receive an indication from the network indicating to generate CIR, PDP, and/or DP.

The WTRU may receive a threshold (e.g., power threshold) from the network and/or timing range (e.g., 0 μs to 1 μs), timing granularity (e.g., every 0.1 μs in the indicated timing range, 100 sample points in the indicated timing range) of CIR, PDP, and/or DP. In this case, the WTRU may report power and/or timing (e.g., relative timing compared to a reference timing and/or absolute timing, etc.) any samples whose received power is over the threshold. The WTRU may send measurements in a report to the network (e.g., LMF and/or gNB) via a semi-static (e.g., LPP and/or RRC) and/or dynamic message (e.g., UCI and/or UL MAC-CE). Herein, "PRS", "DL-RS" (e.g., CSI-RS, DM-RS, and/or TRS) and "SSB" may be used interchangeably.

A measurement and/or location report may include several different types of information. The WTRU may receive a request from the network to report its location and/or measurements made on the PRS. The location report may contain inference (e.g., WTRU location estimate) generated by an artificial intelligence/machine learning (AI/ML) model(s). The WTRU may report to the network at least one or combination of the following in the measurement report: PRS ID associated with measurements and/or WTRU location estimate; TRP ID associated with measurements and/or WTRU location estimate; cell ID associated with measurements and/or WTRU location estimate; ARFCN associated with measurements and/or WTRU location estimate; PRS resource ID(s) associated with measurements and/or WTRU location estimate; PRS resource set ID(s) associated with measurements and/or WTRU location estimate; frequency layer ID(s) associated with measurements and/or WTRU location estimate; timestamp indicating when the measurements are made or when the report is made; RSTD associated with PRS resource ID(s) for each path in multipaths; RSRP associated with PRS resource ID(s) for each path in multipaths; phase measurement (e.g., RSCP, RSCPD) for each path in multipaths; uncertainty information (e.g., expressed in terms of a range such as ±2 us) or quality information (e.g., indicating whether the indicated measurement is in the unit of 0.1 us) or 0.01 us) for measurements; timing error group (TEG) associated with measurements or PRS resource ID or PRS resource set ID; line of sight (LOS) indicator associated with PRS resource ID or TRP ID; WTRU location (e.g., absolute location with geographical coordinates expressed by x and y coordinates, relative location with respect to a reference point (e.g., indicated TRP, cell center)); uncertainty information for the determined WTRU location (e.g., expressed in terms of a range such as ±2 meter) or quality information (e.g., indicating whether the indicated WTRU location is in the unit of 0.1 meter or 0.01 meter); and/or a timestamp indicating when inference (e.g., WTRU location estimate generated by AI/ML model(s)) is applicable.

Figure 3:
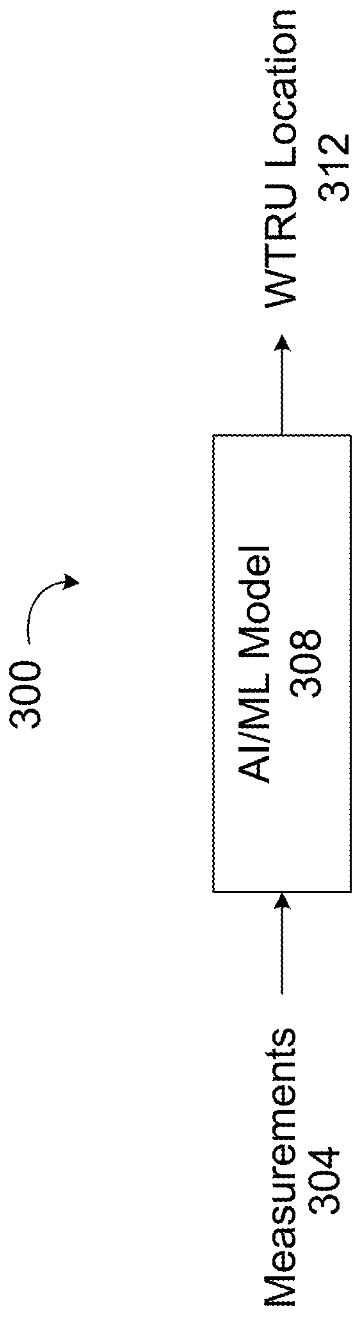
FIG. 3 is a diagram depicting using an artificial intelligence/machine learning (AI/ML) model to estimate wireless transmit/receive unit (WTRU) location.

For example, the timestamp may indicate where the WTRU is at the indicated timestamp; indication of which method (e.g., RAT dependent positioning method such as DL-TDOA, DL-AOD, or AI/ML based positioning) is used to determine the WTRU location; assistance information, PRS configuration (e.g., PRS resource ID) or association information used to generate the reported inference; channel impulse response and associated DL-RS configurations used to determine CIRs; and/or model or functionality ID used to generate WTRU location estimate Artificial intelligence may be broadly defined as the behavior exhibited by machines that mimics cognitive functions to sense, reason, adapt, act, and/or providing the ability to discern patterns. An example of using an AI/ML model to obtain WTRU location is shown in FIG. 3. FIG. 3 is a diagram 300 depicting using an artificial intelligence/machine learning (AI/ML) model to estimate wireless transmit/receive unit (WTRU) location 312. The WTRU may input the AI/ML model with measurements 304 (e.g., timing, phase, power measurements such as RSTD, time of flight, time of arrival (ToA), time of departure (ToD), carrier phase measurement, carrier phase difference measurement, RSRP, and/or RSRP per path). The WTRU may obtain the WTRU location 312 from the AI/ML model 308. The output of the AI/ML model 308 may be referred to as "inference".

As an input to the AI/ML model, if the AI/ML model is associated with or trained with measurements from more than one TRPs, the WTRU may use measurements made from more than one TRPs. If the AI/ML model is trained with measurements from more than one TRP, the WTRU may receive an indication and/or configuration from the network about identification information about the TRPs (e.g., TRP IDs and/or PRS IDs) on which the AI/ML model is trained. Herein, "AIML" and "AI/ML" may be used interchangeably.

Examples of inputs for an AI/ML model for positioning may be at least one or combination of the following: RSRP of PRS resource(s); statistical measure of RSRP (e.g., mean, variance etc.) per PRS resource(s); maximum or minimum value of RSRP per PRS resource(s); RSRP of PRS resource (s) per path; RSRP of PRS resource(s) per antenna port; RSCP of PRS resource(s) per path; RSCP of PRS resource(s) per antenna port; RSTD and/or RSCPD of PRS resource(s); statistical measure of RSTD per PRS resource(s); maximum or minimum value of RSTD per PRS resource(s); RSTD and/or RSCPD of PRS resource(s) per path; RSTD and/or RSCPD of PRS resource(s) per antenna port; time of arrival per PRS resource(s); time of arrival per PRS resource(s) per path; time of arrival per PRS resource(s) per port; statistical measure of time of arrival per PRS resource(s); maximum or minimum value of time of arrival per PRS resource(s); CIR estimated based on DL-RS(s) (e.g., PRS, CSI-RS, and/or DM-RS) where CIR may be associated with a TRP or TRPs; PDP estimated based on DL-RS(s) (e.g., PRS, CSI-RS, and/or DM-RS)) where CIR may be associated with a TRP and/or TRPs; and/or DP estimated based on DL-RS(s) (e.g., PRS, CSI-RS, and/or DM-RS)) where CIR may be associated with a TRP and/or TRPs.

Figure 4:
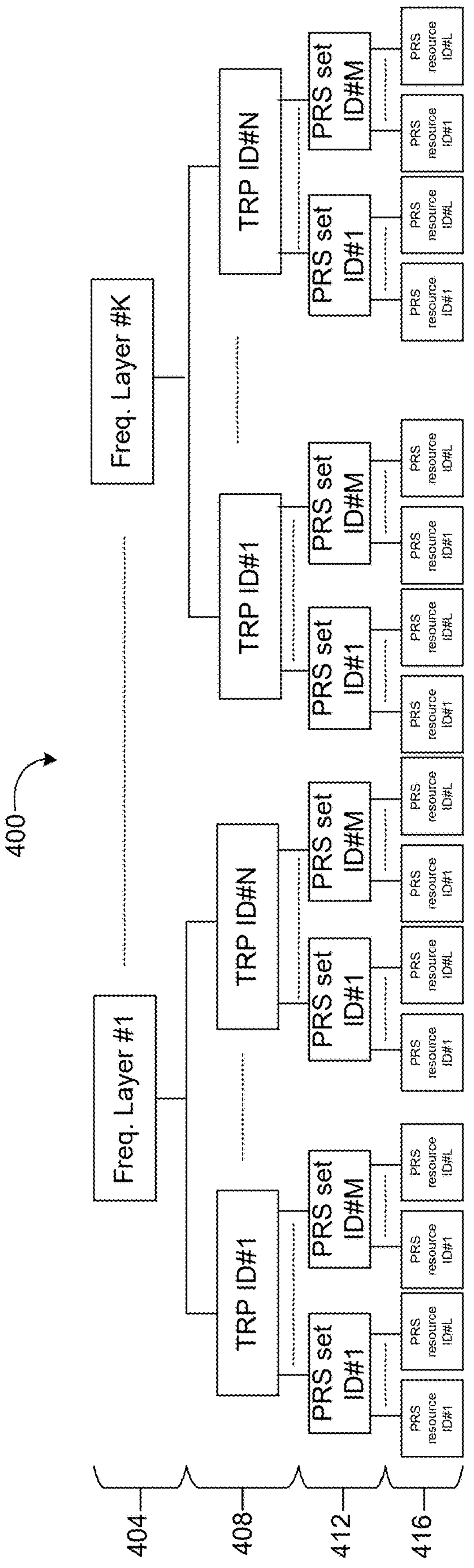
FIG. 4 is a diagram depicting a hierarchical structure of positioning reference signal (PRS) configurations.

FIG. 4 depicts a hierarchical structure 400 of positioning reference signal (PRS) configurations. As illustrated in FIG. 4, PRS parameters may be organized in a hierarchical manner. Parameters at lower layer(s) may use parameters associated with higher layer(s). For example, if a frequency layer 404 has a parameter comb factor=2, TRPs 408, PRS resource sets 412, and/or PRS resources 416 under the frequency layer may also use comb factor=2. The parameters may be organized in a hierarchical manner to reduce signaling overhead from the network.

An AI/ML functionality may be at least one or combination of the following: an AI/ML functionality may define what a WTRU can do with the AI/ML functionality (e.g., AI/ML based positioning). The AI/ML functionality may indicate characteristics of input and/or output of an AI/ML model. An AI/ML functionality may indicate type(s) of measurements the AI/ML model(s) can accept. An AI/ML functionality may indicate validity conditions for inference generated by the AI/ML model(s). An AI/ML functionality may indicate a validity condition for the AI/ML model(s). An AI/ML functionality may indicate type(s) of inference the AI/ML model(s) can generate (e.g., WTRU location, intermediate metric such as LOS indicator, measurement). An AI/ML functionality may indicate capabilities of the AI/ML model(s) (e.g., latency required to generate inference, the number of inputs, memory size, and/or computational complexity).

An AI/ML functionality may be AI/ML based positioning. If the WTRU indicates the AI/ML based positioning as the supportable AI/ML functionality, then the WTRU may indicate that the WTRU may have an AI/ML model(s) capable of performing AI/ML based positioning.

The WTRU may indicate that the supportable AI/ML functionality is BW aggregation based AI/ML-based positioning. This indicates that the WTRU may have an AI/ML model that can accept measurements made based on BW aggregation. In another example, the WTRU may indicate that supportable AI/ML functionality is PDP-based AI/ML based positioning. This may indicate that the AI/ML model the WTRU has can accept PDP as its inputs.

The WTRU may indicate the supportable AI/ML functionality is AI/ML based positioning with indicated maximum synchronization error. This indicates that the WTRU may have AI/ML model(s) that can tolerate timing error and/or network synchronization error up to the indicated maximum synchronization error.

Some tolerance difference in assistance information and/or PRS configuration between training and inference may be allowed. For example, assistance information used by the WTRU to train an AI/ML model may be different from assistance information the WTRU receives when the WTRU is requested to generate inference based on the trained AI/ML model. Network synchronization error may be different by a few tenths of a micro-second between the training phase and/or inference phase and such difference may not affect inference performance. The WTRU may be preconfigured and/or configured with tolerance difference in assistance information between training and/or inference phase. If the difference is above the tolerable difference, the WTRU may use the fallback positioning method and/or report to the network that the WTRU cannot perform AI/ML based positioning due to the difference.

PRS configurations and/or assistance information may be the same. For example, between training and inference phase, PRS configuration parameters such as frequency layer ID, TRP IDs, and/or cell IDs may be the same for the AI/ML model to be valid.

The WTRU may indicate that a supportable AI/ML functionality can accept N PDPs where each PDP is generated based on PRSs received from TRPs. The WTRU may indicate that the supportable AI/ML functionality is area-based AI/ML-based positioning. This may indicate that the WTRU can perform positioning with an AI/ML model(s) that generate inference (e.g., WTRU location) in the area associated with the AI/ML model(s).

The WTRU may indicate that the support for an AIM functionality with which INACTIVE mode base AI/ML based positioning can be achieved. The WTRU may determine an applicable AI/ML functionality based on WTRU condition, WTRU capabilities, network condition, DL-RS configuration, and/or assistance information given by the network.

An AI/ML functionality may be identified through reporting of WTRU capabilities. The reported capabilities may relate to AI/ML capabilities (e.g., whether the WTRU is capable of supporting AI/ML based positioning), positioning capabilities (e.g., whether the WTRU is capable of supporting DL-TDOA, how many TRPs and/or PRSs the WTRU can measure) and/or communication capabilities (e.g., whether the WTRU is capable of supporting MIMO communication).

In an AI/ML based positioning method, the WTRU may use AI/ML model(s) to obtain WTRU location. The input of the AI/ML model(s) may be based on the measurements made on the received DL-RS. The WTRU may receive the DL-RS and/or processed by an AI/ML model training server.

An AI/ML functionality can be identified through WTRU side conditions, network side conditions and/or DL-RS configurations. For example, the WTRU may indicate that the WTRU has low battery power or hardware is overheating. Such condition may imply that the WTRU can only support low-complexity AI/ML functionality (e.g., making measurements from the serving cell only at large measurement periodicity).

A DL-RS configuration may identify an AI/ML functionality. For example, the DL-RS configuration indicating frequency layer aggregation may imply that the WTRU needs to use AI/ML model(s) that can accept measurements made from aggregated frequency layers as AI/ML inputs.

Network side conditions may identify an AI/ML functionality. For example, the network assistance information may indicate a large synchronization error between TRPs and/or gNBs. The network may indicate that the WTRU use an AI/ML model(s) trained based on a similar condition (e.g., trained with data which is generated at the same or similar range of synchronization error).

Assistance information provided by the network (e.g., associated ID) may indicate AI/ML functionality. For example, the WTRU may determine an AI/ML functionality based on the content of a request sent by the network. The network may send a request to perform positioning and/or AI/ML based positioning using an indicated set of measurements (e.g., PDP, timing, power, phase, and/angle measurements). The WTRU may receive a request to report measurements and/or WTRU location to the network. Based on the request about measurements and/or report content, the WTRU may determine an AI/ML functionality that can accept the requested measurements and/or yield the requested report content (e.g., WTRU location). The request may contain an explicit indication of which functionality to use (e.g., via functionality ID).

An AI/ML functionality may be defined by input type and/or output type. For example, for a functionality ID #1, input type may be PDP and/or output type may be the WTRU location. For functionality ID #2 input type may be DP and/or output type may be DP.

The WTRU may determine an AI/ML functionality based on a configured positioning method. For example, the WTRU may be configured with a timing-based positioning method (e.g., DL-TDOA). The WTRU may receive, from the network, an indication to use an AI/ML model to determine the WTRU location. Based on the configured positioning method and assistance information, the WTRU may determine the AI/ML functionality (e.g., which AI/ML model(s) to use for positioning). The WTRU may receive a configuration for an AI/ML based positioning method. Based on the configured positioning method, the WTRU may determine the AI/ML functionality.

Whether the WTRU can use the AI/ML functionality may depend on WTRU conditions, PRS configurations, and/or network conditions. If WTRU conditions change dynamically, the WTRU may send an update to the network about supportable AI/ML functionalities. Examples are described herein.

The WTRU may receive a request for inference from the network which triggers the inference phase. The WTRU may also receive association information and/or PRS configuration from the network. Based on the association information and/or PRS configuration received from the network, the WTRU may generate inference and report the inference to the network.

An associated ID may indicate network side additional conditions (e.g., network side implementation). Network side additional conditions may be defined by details related to implementations at the network. For example, network side additional conditions may include angles of antenna panels and/or number of antenna elements in the antenna panel. If the same associated ID is indicated during training and/or inference phases, the WTRU can assume that the network side additional conditions are consistent across training and inference phase. The WTRU may determine with high confidence that the WTRU can generate inference based on the trained AI/ML model(s). For AI/ML positioning, the LMF may indicate the associated ID to the WTRU. In this disclosure, "training" and "data collection" may be used interchangeably.

For positioning, an AI/ML model may be associated with an area and/or several gNBs from different vendors that can co-exist in the area. In such a case, the LMF may coordinate with multiple gNBs. The gNBs may indicate to the LMF the feasibility of consistent implementations and/or network side additional conditions (e.g., angles of antenna panels) across the training and/or the inference phase. If the LMF receives such an indication from the gNBs, the LMF may issue an associate ID. An associated ID may be issued during training and/or inference phase only when all gNBs and/or cell(s) in an area indicate to the LMF that the same network side additional conditions may be maintained across the two phases. Such an occurrence may be rare; the same associated ID may rarely be issued by the LMF between training and inference phase.

Associated ID may be associated with implementation details. However, granularity of implementation may be so fine that large number of associate IDs need to be defined to capture different granularities of implementation.

If the WTRU obtains trained AI/ML models from an over-the-top (OTT) server, incompatibility in associated IDs between training and/or inference configurations may occur since the details in the training data collected by the OTT server may not be known to the LMF. Therefore, the LMF may not know the associated ID(s) used during the training phase. Constraining the WTRU to perform inference when the same associated IDs are used between training and inference phase may be too restrictive.

The WTRU may receive association information from the network. The association information may include PRS configurations (e.g., TRP IDs) that will remain consistent.

The association information may also have a timestamp. Based on timestamp and/or content of association information, the WTRU may determine consistency in network side additional conditions between data collection and inference phase (e.g., fully consistent, partially consistent, and/or no consistency). Based on determined consistency, the WTRU determines whether to generate an inference.

The WTRU may receive a trained AI/ML model (e.g., from an OTT server) with a first association information related to model training. The WTRU may receive a request for inference from the network (e.g., LMF). The WTRU may send a request (e.g., to the LMF) for a second association information related to inference. The WTRU may receive an RS configuration and/or the second association information related to inference.

The WTRU may determine the consistency between the first association information and the second association information. If the first and second association information are equivalent, then the WTRU may determine they are fully consistent. If the first and second association information indicate overlap in information, then the WTRU may determine they are partially consistent. If the first and second association information are completely different, then the WTRU may determine they are partially consistent.

The WTRU may determine a method to obtain feedback and/or a feedback value, based on the determined consistency between the first association information and the second association information. If the first and second association information are fully consistent, then the WTRU may determine to use the trained AI/ML model to obtain a feedback value composed of one or more inference value(s). If the first and second association information are partially consistent, then the WTRU may determine to use the trained AI/ML model to obtain a feedback value composed of one or more inference value(s). In this case, the WTRU may also use the difference in association information between the first and second association information (e.g., timestamp of the first association information used during data collection and/or content of the first association information that is not included in the second association information). If the first and second association information are not consistent, then the WTRU may determine to use a fallback method to obtain the feedback value (e.g., fallback to a configured RAT-dependent positioning method (e.g., DL-TDOA)). If the WTRU does not receive a first or a second association information, then the WTRU may determine to use a fallback method to obtain the feedback value (e.g., fallback to a configured RAT dependent positioning method (e.g., DL-TDOA)). The WTRU may report the feedback value obtained based on the determined consistency.

The WTRU may assume that PRS configurations (e.g., TRP) within the association (e.g., a group of TRPs) will retain their implementation. Examples of consistent implementation among TRPs in an association include, but are not limited to: relative difference in synchronization error among the TRPs is constant; and/or relative difference in antenna tilt/direction among the TRPs is constant, etc. For example, all TRPs antenna may face east but as long as they remain constant, implementation is consistent.

If implementations of a TRP within the association changes (e.g., since the last occasion), and the LMF deems the association to be inconsistent, then the LMF may remove the TRP from the association.

If there are changes within the association, the LMF may issues a new timestamp for the association issued by the LMF. The new timestamp may indicate the formation date of a new association.

Figure 10:
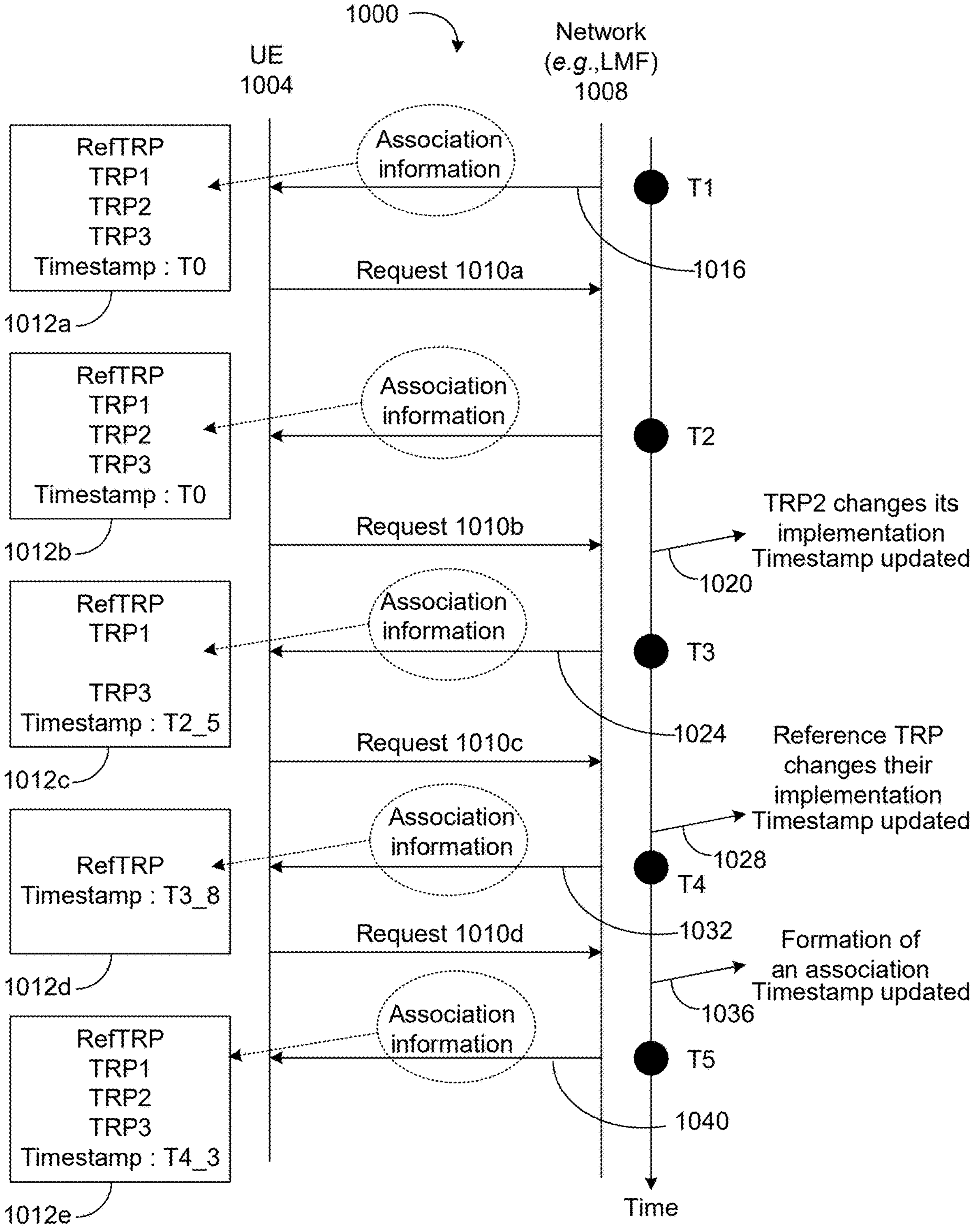
FIG. 10 is a call flow depicting reference transmission-receive point (TRPs).

There may be a reference TRP in the association where implementation of other TRPs may be defined with respect to the reference TRP (e.g., relative antenna tilts with respect to the reference TRP). An example is illustrated in FIG. 10.

If implementation of the reference TRP within the association changes, then the LMF may remove the association from the configuration.

Figure 9:
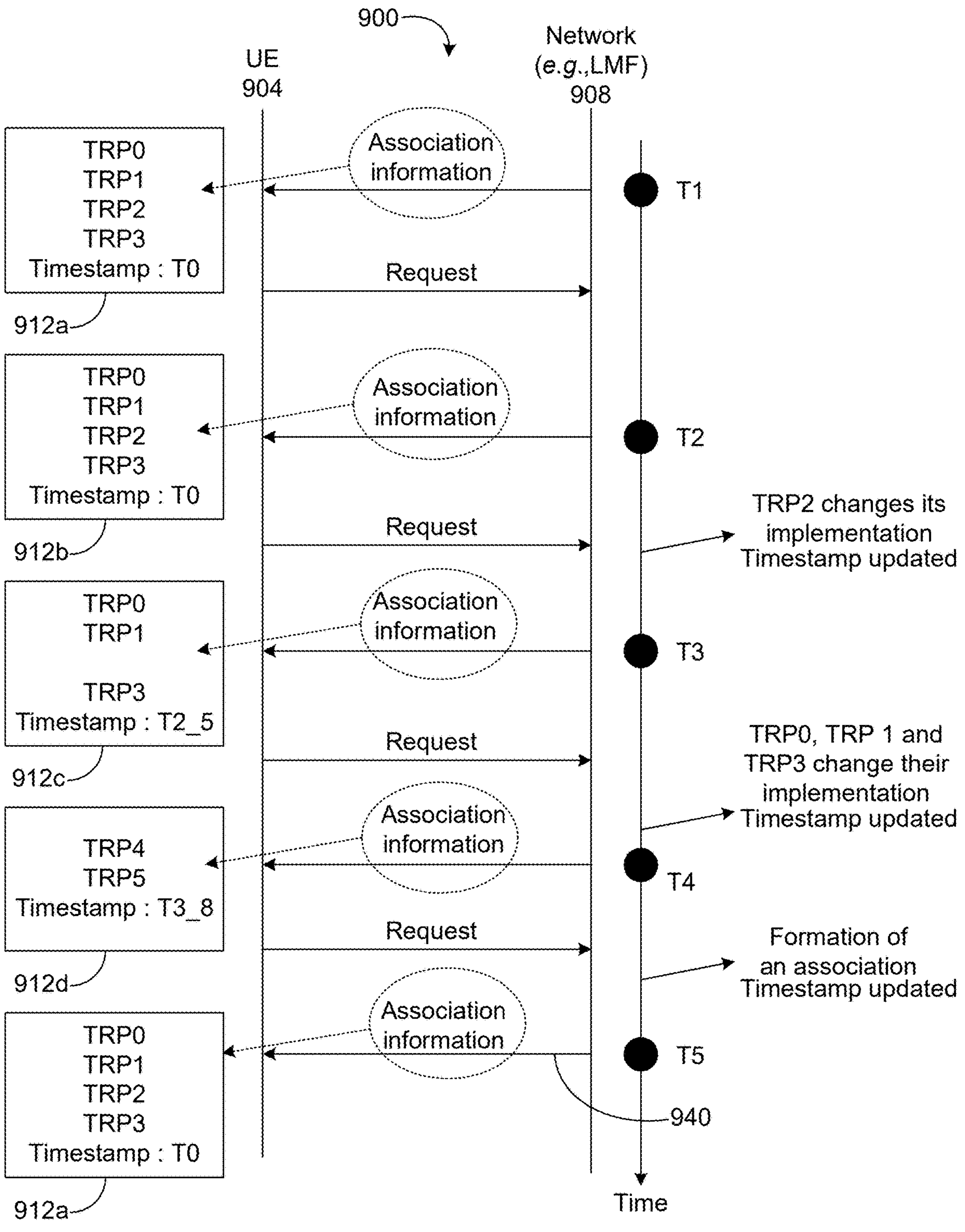
FIG. 9 is a call flow depicting content of association information and generation of timestamps wherein association information of an old timestamp is delivered to the WTRU.

The LMF may send association information with an old timestamp to the WTRU. An example is illustrated in FIG. 9. The old timestamp may indicate that network side additional conditions from the past may be activated.

Figure 8:
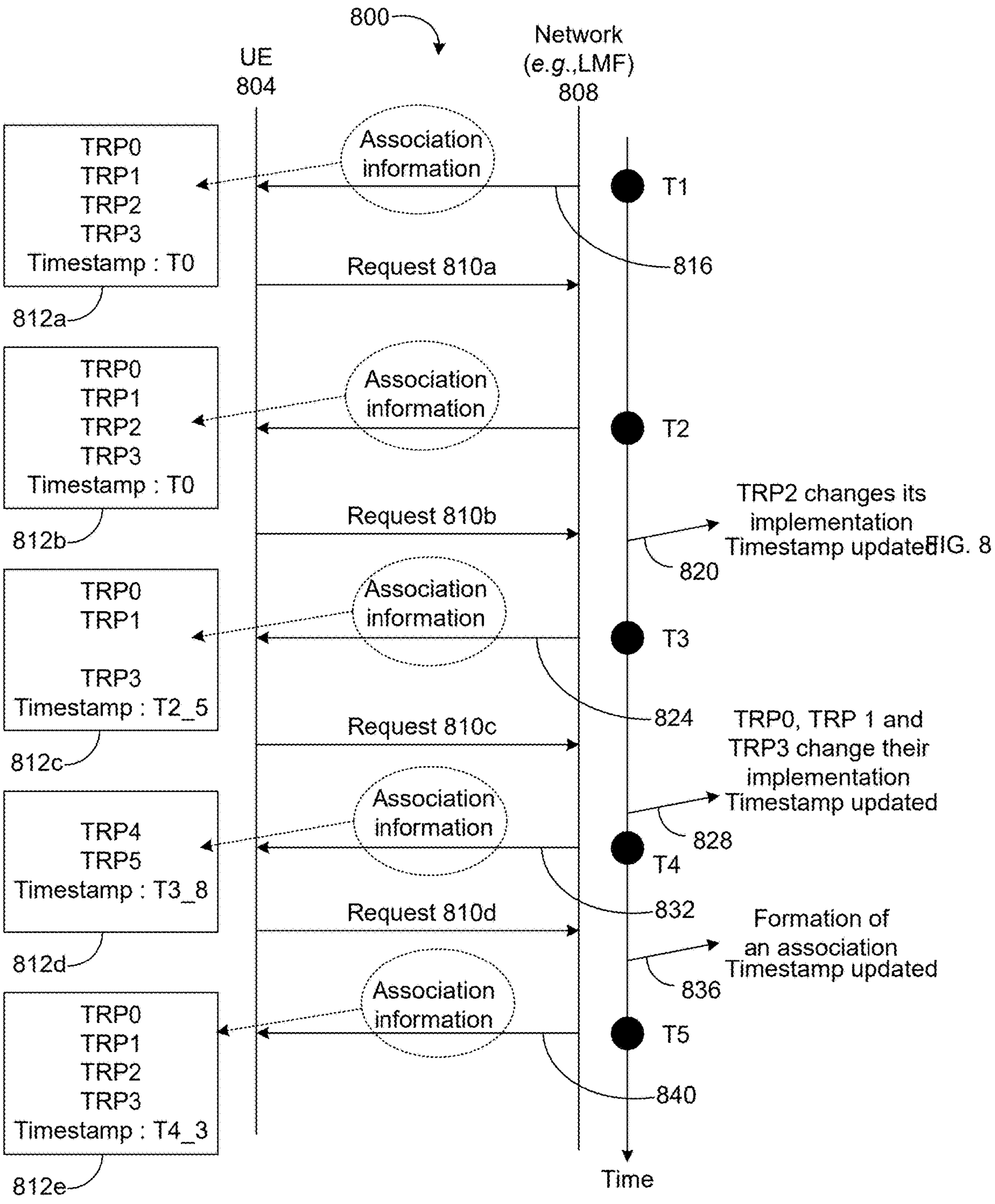
FIG. 8 is a call flow depicting content of association information and generation of timestamps.

The WTRU may determine the consistency type between training and inference phase by comparing association and its timestamp. The WTRU may determine full consistency if the association and its timestamp match between training and inference phase. For example, association information at T1 and T2 in FIG. 8 are fully consistent, association information at T1 or T2 and T5 in FIG. 9 are fully consistent.

The WTRU may determine partial consistency if part of the association overlaps between training and inference phase. The WTRU may determine partial consistency if the content of the association is the same but their timestamps are different. For example, association information at T1 and T3 in FIG. 8 are partially consistent, association information at T1 and T5 in FIG. 8 are partially consistent due to unequal timestamp.

The WTRU may determine no consistency if there is no overlap in association between training and inference phase. For example, association information at T1 and T4 in FIG. 8 are not consistent.

The WTRU may generates inference (e.g., WTRU location) when association information is fully consistent or partially consistent between training and inference phase. If association information is partially consistent, then the WTRU may report to the LMF the association information, timestamp used for data collection, and/or the inference outcome obtained for the inference phase. For example, in FIG. 8, the WTRU may be configured with data collection with association information associated to time T1 (e.g., using timestamp value T0). In this example, if the WTRU performs inference at time T5, then the WTRU may reports the inference value(s), the data collection association information, and/or timestamp (e.g., T0).

The WTRU may receive association information as assistance information from the network (e.g., LMF and/or gNB) via higher layer signal (e.g., LPP). An association information may contain PRS configurations (e.g., TRP IDs, PRS IDs, and/or cell IDs). Association information may consist of a combination of PRS configurations. In addition, the assistance information that includes association information may contain a timestamp.

The WTRU may receive association information via broadcast, groupcast, and or unicast. The WTRU may assume PRS configurations (e.g., TRP and/or PRS) within the association may retain their implementation. The WTRU may determine that the configurations within the association information are consistent until the WTRU receives new association information. In the examples described herein, "association information" and "assistance information" may be used interchangeably.

The network (e.g., LMF) may explicitly indicate the training phase and/or inference. The WTRU may implicitly indicate the training phase and/or inference.

Training phase may be defined by the duration during which the WTRU and/or training entity receives PRS and/or trains an AI/ML model with measurements and/or associated ground truth. The training phase may be terminated by the network and/or by request from the WTRU and/or training entity. The termination request may indicate that training is complete and/or that the WTRU received trained AI/ML models.

The inference phase may be defined by the duration wherein the WTRU uses the trained AI/ML model(s) to generate inference. The inference phase may start when the WTRU receives, from the network, a request for reference (e.g., WTRU location). The inference phase may start when the WTRU requests, from the network, for location information, transmission of PRS, assistance information, and/or PRS configuration.

The training phase and inference phase may overlap in time. For example, the OTT server and/or WTRU may be training AI/ML models as the WTRU generates inference as per request from the network.

The WTRU may receive from the AI/ML model training entity, the parameters for the trained AI/ML model (e.g., weights) and/or meta data for the AI/ML model. The meta data may contain PRS configurations, assistance information, and/or association information used during the training phase.

An AI/ML model training entity (e.g., WTRU, OTT, and/or network) may need to train an AI/ML model using measurements or data (e.g., CIR) derived from the measurements. Training an AI/ML model may require measurements. In the examples herein, "training" and "data collection" may be used interchangeably.

During the training phase, the entity may collect measurements based on the received DL-RS and/or from other entities (e.g., WTRU, OTT, and/or network). Using the collected measurements, the entity may train an AI/ML model. A WTRU may obtain the trained AI/ML model from the entity.

Association information and/or assistance information related to network implementations provided by the network is important for the AI/ML model training entity (e.g., WTRU, OTT, and/or network) as the assistance information indicates the conditions under which the AI/ML model is trained. These conditions may include at least one of the following; TRP location; angle in antenna or antenna panels at TRPs; location of antenna or antenna panels at TRPs; synchronization error among gNBs and/or TRPs; beam shape, beam width; boresight direction of a beam; characteristics of hardware or software at the network, such as characteristics of an amplifier used for transmission, number of antenna elements at Tx and/or Rx, number of panels, etc.; and/or timing, power and/or phase offset in signals transmitted by a TRP.

Association information and/or assistance information received during the training phase may be associated with the trained AI/ML model(s). Such association information may be referred to as training association information. The WTRU and/or training entity may determine to associate association information with trained AI/ML model(s) and/or AI/ML functionality.

The WTRU may determine to indicate, to the network, association information and/or assistance information associated with the trained AI/ML models to the network via RRC, LPP, UCI, MAC-CE, and/or WTRU capability report. The WTRU may send the indication to the network, if the WTRU receives a request from the network and/or receives AI/ML model(s) from the model training entity (e.g., WTRU, OTT, and/or network). The training entity may be the WTRU (e.g., the WTRU trains AI/ML model(s)).

The WTRU may use RRC and/or LPP message, UCI, and/or MAC-CE to send a report (e.g., WTRU location, consistency, result of performance monitoring, and/or life cycle management result) to the network. The WTRU may receive the trained AI/ML model from a model training entity. The WTRU may receive a request to generate inference from the trained AI/ML model based on DL-RSs transmitted by the network. In this case, the WTRU may need to know whether the current conditions (e.g., network implementations) align with the conditions when the AI/ML model was trained by the training entity. If the conditions during training and inference phase align, then the trained AI/ML model trained under the same or similar conditions may generate inference that reflects training the model received. Therefore, if the conditions are aligned between training and inference phase, then the WTRU may determine that the conditions are consistent (e.g., full or partial consistency). If the WTRU determines that the trained AI/ML is suitable, then the WTRU may use the AI/ML to generate inference. If conditions are not consistent, the WTRU may determine how similar the conditions are between two phases and/or determine whether to use the trained AI/ML model to generate inference.

The WTRU may have more than one model or functionalities where each model or functionality may be associated with different training association information. The WTRU may receive, from the network, association information during the inference phase. This association information may be referred to as inference association information. The WTRU may compare training association information and inference association information for each model. The WTRU may then determine which model(s) satisfy consistency conditions (e.g., full, partial, or no consistency). The WTRU may report results of consistency check by indicating consistency result (e.g., full, partial, or no consistency) for each model or functionality. The WTRU may activate the model with the most consistency result (e.g., full consistency).

The WTRU may receive a request for an inference from the network which triggers the inference phase. The WTRU may send a request for assistance and/or association information to generate the inference.

Figure 5:
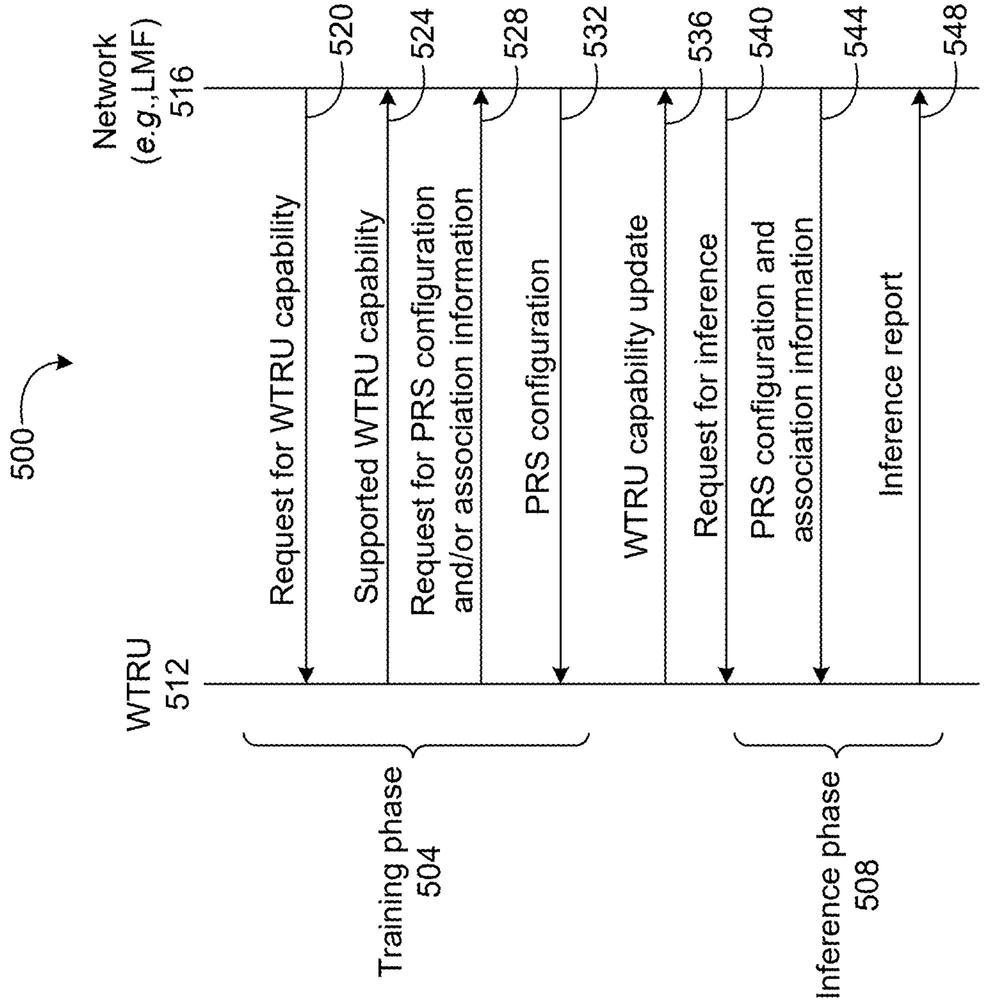
FIG. 5 is a call flow depicting training and inference phases when artificial intelligence/machine learning (AI/ML) training is conducted on a WTRU.

FIG. 5 is a call flow 500 depicting training 504 and inference 508 phases when AI/ML model training is conducted on the WTRU 512. At 520, the WTRU 512 may receive a request from the network 516 (e.g., LMF) for WTRU 512 capabilities. At 524, the WTRU 512 may indicate supported WTRU 512 capabilities. At 528, the WTRU 512 may send a request for PRS configurations and/or association information. At 532, the WTRU 512 may receive PRS configurations and/or association information from the network 516.

At 536, the WTRU 512 may send an update for WTRU 512 capability to the network 516. In the message, the WTRU 512 may indicate to the network 516 that an AI/ML model(s) has been trained using the measurements obtained from received PRS. The WTRU 512 may indicate to the network 516 that the WTRU 512 obtained AI/ML model(s) from the AI/ML model training entity. In the WTRU 512 capability update at 536, the WTRU 512 may include information related to the trained AI/ML model. This information may indicate that the trained AI/ML model may be a model ID and/or a functionality ID, etc.

At 540, the WTRU 512 may receive a request for inference (e.g., WTRU 512 location) from the network 516. The WTRU 512 may receive from the network 516 a functionality ID and/or model ID indicating which functionality and/or model ID to use. The WTRU 512 may reply to the request (e.g., acknowledgment, acceptance of the request, and/or rejection of the request). At 544, the WTRU 512 may receive from the network 516 PRS configurations and/or assistance information to use for generation of inference. In addition, the WTRU 512 may receive association information from the network to check for consistency. The WTRU 512 may perform consistency check, wherein the WTRU checks whether network 516 side implementations are consistent between training and inference phases. The WTRU may then report the result of consistency check. At 548, the WTRU may report inference generated from an AI/ML model(s).

Figure 6:
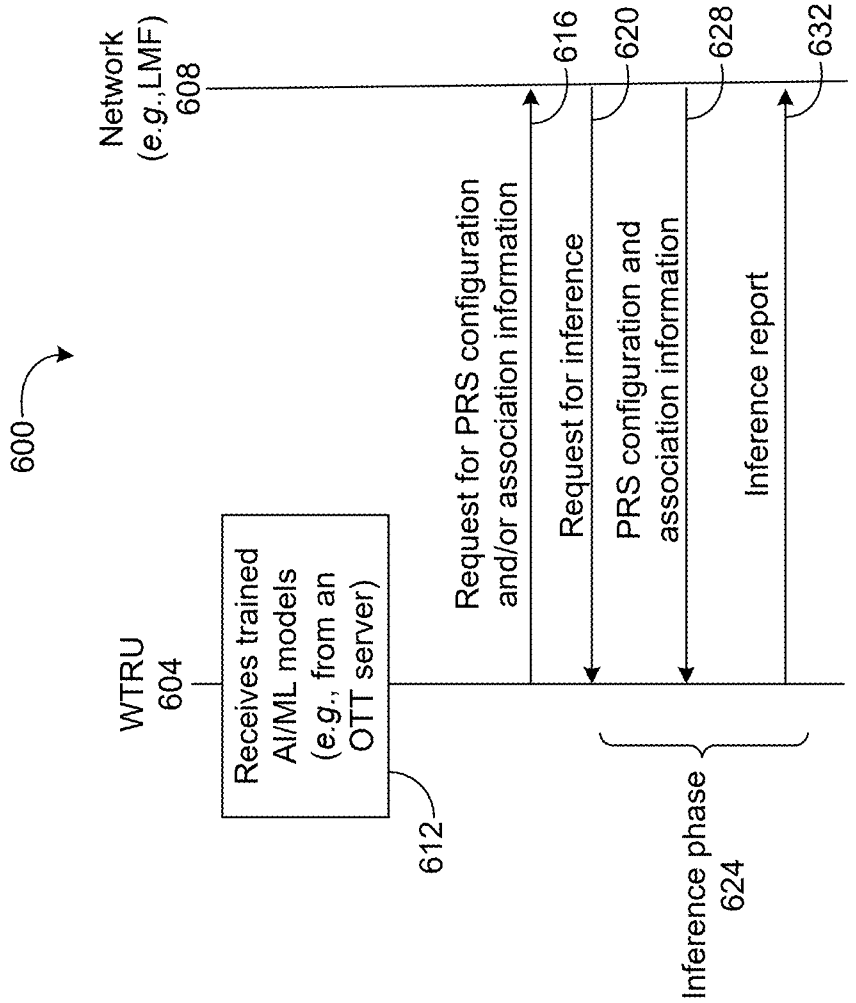
FIG. 6 is a call flow depicting the WTRU behavior when the WTRU receives an AI/ML model(s) from a server.

FIG. 6 is a call flow 600 depicting the WTRU behavior when the WTRU 604 receives an AI/ML model(s) from a server. At 612, the WTRU 604 may receive a trained AI/ML model from the AI/ML model training entity (e.g., OTT server). The AI/ML model received from the training entity may contain or be associated with association and/or assistance information used during training. The WTRU 604 may determine assistance information from the metadata accompanying the AIM model. The training entity acquired necessary training data (e.g., measurements) during the training phase. Thus, the training phase is omitted in FIG. 6 since the WTRU 604 did not go through the training phase.

At 616, the WTRU 604 may send a request to the network 608 for PRS configurations and/or association information. At 620, the WTRU may receive a request for inference which triggers the inference phase 624. At 628, the WTRU 604 may receive PRS configurations and/or association information from the network 608. At 632, based on the association information and/or received PRS configuration, the WTRU 604 may report inference to the network 608.

Figure 7:
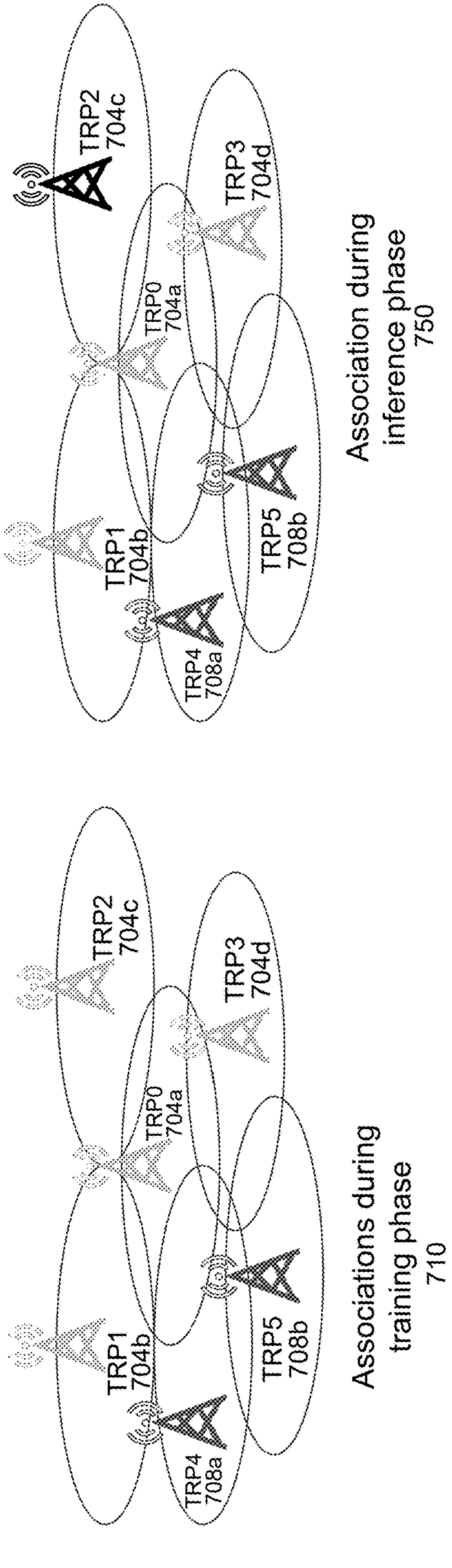
FIG. 7 depicts association information between the training phase and the inference phase.

FIG. 7 depicts association information between training phase 710 and inference phase 750. As shown in FIG. 7, where the association information may indicate TRP IDs. For example, the WTRU may receive association information from the network during the training phase 710 where the first group of association includes TRP0 704*a*, TRP1 704*b*, TRP2 704*c*, and TRP3 704*d* while the second group of association includes TRP4 708*a* and TRP5 708*b*. During the inference phase 750, the WTRU receives association information from the network where the first group of association includes TRP0 704*a*, TRP1 704*b*, and TRP3 704*d* while the second group of association includes TRP4 708*a* and TRP5 708*b*. In the example depicted in FIG. 7, TRP2 704*c* does not belong to any association during the inference phase FIG. 8 is a call flow 800 depicting content of association information and generation of timestamps. Specifically, FIG. 8 illustrates an example of a signal call flow between WTRU 804 and the network (e.g., LMF 808). In FIG. 8, the content of association information 812*a* delivered from the LMF 808 is shown. Association information 812*a-e* may be provided based on requests 810*a-d* from the WTRU 804. However, the LMF 808 may provide association information 812*a-e* periodically or semi-persistently. At 816, at t=T1, the LMF 808 may provide association information 812*a* in which TRP0, TRP1, TRP2, and TRP3 forms an association. The association may be formed at t=T0 and/or the corresponding timestamp is included in the association information 812*a*.

At 816, based on the request occurring prior to the start of the call flow depicted in FIG. 8, from the WTRU 804, the LMF 808 may provide association information 812*a* at time t=T1. The LMF 808 may provide, to the WTRU 804, the association provided at t=T0 indicating that implementations at the LMF 808 have not changed since t=T0. The WTRU 804 may send a request 810*a*. Based on the request 810*a*, the UE may receive association information 812*b* at time t=T2, indicating that that implementations at the LMF 808 have not changed since t=T0.

At 820, at t=T2_5, the LMF 808 may change implementation at TRP2. The LMF 808 may update association information by removing TRP2 and/or updating the timestamp for the association to T2_5. At 824, based on the request 810*b* from the WTRU 804, the LMF 808 may provide association information 812*c*. The association information 812*c* may include TRP0, TRP1, and TRP3 at time t=T3 with the updated timestamp. The LMF 808 may update the association before or after it receives, from the WTRU 804, a request for association information. At 828, at=T3_8, the LMF 808 may change implementations of TRP0, TRP1, and/or TRP3. At 832, based on the request 810*c* from the WTRU 804, the LMF 808 may provide association information 812*d* with a new timestamp at t=T4. At 836, at t=T4_3, the LMF 808 may form a new association, comprising TRP0, TRP1, TRP2, and TRP3. At 840, based on the request 810*d* from the WTRU 804, the LMF 808 may provide association information 812*e* with a new timestamp at t=T5.

The WTRU may receive, from the network, association with a timestamp which may revert (e.g., refers to) to the past association. The WTRU may receive the same association with the timestamp the WTRU has already received. In this case, the WTRU may determine that the past network implementation is recreated. The WTRU may be configured with more than one association with or without a timestamp. Each association may have a unique index. The WTRU may receive the index as association information. The WTRU may determine that network implementations correspond to the association indicated by the index. FIG. 9 illustrates such an example.

FIG. 9 is a call flow 900 depicting content of association information 912*a-d* and/or generation of timestamps. As depicted in FIG. 9, association information 912*a* of an old timestamp is delivered to the WTRU 904. Up to t=T5, formation of association and/or content of association information may be the same as depicted in FIG. 8. At 940, at t=T5, implementation at the network 908 may be same implementation as the one at time t=T0. Thus, the LMF 908 may send association information 912*a* with the timestamp T0 indicating the previously used association is realized at the network 908. The WTRU 904 may determine, from association information 912*a*, that the network 908 implementation is consistent with the implementation at t=T0.

FIG. 10 is a call flow 1000 depicting reference transmission-receive point (TRPs). The WTRU 1004 may be configured with a reference TRP in association information 1012*a-e*. The WTRU 1004 may determine the reference TRP from configuration. The WTRU 1004 may identify the reference TRP by a TRP ID and/or index. The network (e.g., LMF 1008) may update the reference TRP in the association. The reference TRP may be the reference TRP used for measurements (e.g., RSTD, AoA, and/or AoD). Thus, the WTRU 1004 may determine the reference TRP in association information 1012*a-e* based on the reference TRP used for measurements. The WTRU 1004 may assume that the same reference TRP is used in both association information 1012*a-e* and/or computation and/or determination of measurements. If the network changes implementation at the reference TRP, the network may remove TRPs associated with the reference TRP from the association.

In the example call flow 1000 depicted in FIG. 10, association information may be provided based on requests from the WTRU. At 1016, at t=T1, the LMF 1008 provides association information 1012*a* in which Reference TRP, TRP1, TRP2, and TRP3 forms an association. The association was formed at t=T0 and corresponding timestamp is included in the association information 1012*a*. At 1016, based on the request from the WTRU, the LMF provides association information at time t=T1. The WTRU 1004 may send a request 1010*a*. Based on the request 1010*a*, the UE may receive association information 1012*b* at time t=T2, indicating that that implementations at the network 1008 have not changed since t=T0.

At 1020, at t=T2_5, the LMF 1008 may change implementation at TRP2. The LMF 1008 may update association information by removing TRP2 and/or updating the timestamp for the association to T2_5. At 1024, based on the request 1010*b* from the WTRU 1024*a*, the LMF 1008 may provide association information 1012*c*. The association information 1012*c* may include the reference TRP, TRP1 and TRP3 at time t=T3 with the updated timestamp. The LMF 1008 may update the association before or after it receives, from the WTRU 1004, a request for association information.

At 1028 t=T3_8, the LMF 1008 may change implementations of the reference TRP. At 1032, based on the request 1010*c* from the WTRU 1004, the LMF 1008 may provide association information 1012*d* with a new timestamp at t=T4. At 1036, at=T4_3, the LMF 1008 may form a new association, comprising reference TRP, TRP1, TRP2, and TRP3. At 1040, based on the request 1010*d* from the WTRU 1004, the LMF 1008 may provide association information with a new timestamp at t=T5.

Association information may be a combination of PRS configurations. The combination of PRS configurations may be associated with a timestamp. Such PRS configurations may include, but are not limited to: TRP IDs and/or PRS IDs, cell IDs, global cell IDs, public land mobile network (PLMN) ID; PRS resource IDs, PRS resource set IDs, TRP and/or PRS IDs, frequency layer IDs, cell IDs, and/or global cell IDs; TRP IDs and/or PRS IDs, frequency layer IDs; TRP IDs and/or frequency layer IDs; TRP IDs, PRS resource set IDs, and/or PRS resource IDs; and/or TRP IDs and/or PRS resource IDs.

In these examples, cell and/or PLMN related IDs may be included in association information to avoid ambiguities at the WTRU in case the WTRU receives the same sets of PRS configurations from the network. The WTRU may determine a TRP ID based on the PRS ID. In other examples, cell and/or PLMN related IDs may not be included. The WTRU may determine that the provided association information may be valid only within the cell, global cell, and/or PLMN the WTRU is located.

A timestamp may indicate one or combination of the following: absolute time, relative time with respect to a reference timing (e.g., when connection with the network is established), system time, SFN, frame index, slot index, and/or symbol index.

A timestamp may be indicated as a unique index. The network may determine the index and/or assign the index to association information. Additionally or alternatively, a function may generate the index (e.g., hash function). The WTRU may be configured with the details for the hash function so the WTRU can generate the index using the function.

Depending on the time resolution and/or the number of bits allocated for the timestamps, the timestamp values may wrap around after some specific amount of time, making it difficult to compare the timestamps and/or find the most recent ones. A certain type of hash function may prolong the wrap-around time significantly. To detect the most recent timestamps, the hash function may maintain the chronological order of the timestamps. For a pair of time stamps Ta and Tb, if Ta<Tb, then the hash function may be defined such that Hash (Ta)<Hash (Tb).

A timestamp may be associated with a PRS configuration and/or a set of PRS configurations. Accordingly, a timestamp may be associated with a TRP and/or a group of TRPs. A timestamp may be associated with a PRS ID(s) and/or PRS resource set ID(s). The WTRU may assume that a PRS configuration associated with a timestamp may retain its implementation.

The WTRU may compare the timestamp associated with a PRS configuration (e.g., TRP ID) obtained during the training and/or inference phases. If the timestamps match, the WTRU may determine that the PRS configuration is consistent (e.g., fully consistent).

A timestamp may be associated with a PRS configuration (e.g., TRP ID). The WTRU may compare timestamp of the PRS configuration used during training and/or inference. The WTRU may determine consistency for the PRS configuration if the timestamp is equal. The WTRU may determine a TRP is partially consistent if the difference between the associated timestamp between the training and inference phase is below a configured threshold. To generate inference, the WTRU may determine to use TRPs which have matching timestamps during the training and/or inference phases. In addition to TRPs which are fully consistent, the WTRU may use partially consistent TRPs. The WTRU may use partially consistent TRPS if the WTRU is configured and/or the number of fully consistent TRPs is below the required number of TRPs needed to generate inference for a given AI/ML model.

"Training phase" and "inference phase" may be used interchangeably with "first phase" and "second phase," respectively. Additionally or alternatively, "training phase" and "inference phase" may be used interchangeably with "first timing" and "second timing," respectively. The first phase and/or second phase may be defined by respective timing of occurrence (e.g., first phase occurs earlier than the second phase).

The PRS configuration used to train an AI/ML model may be referred to as "training PRS configuration." The PRS configuration used to generate inference using an AI/ML model may be referred to as "inference PRS configuration."

The WTRU may determine partial consistency if the difference between timestamp of the training PRS configuration and inference PRS configuration is below a configured threshold. The WTRU may determine no consistency if timestamp for the training PRS configuration and inference PRS configuration is not equal. If the difference between timestamp of the training PRS configuration and inference PRS configuration is above a configured threshold, the WTRU may determine that there is no consistency between the two PRS configuration.

The WTRU may receive association information and/or assistance information. If the WTRU receives assistance information, the WTRU may compare assistance information between training and inference phase. If the WTRU receives, from the AI/ML model training entity, assistance information associated with a trained mode, the WTRU may determine to send a request for assistance information from the network.

The WTRU may compare assistance information received during the training phase and inference phase to determine consistency in network side conditions, implementations, and/or additional conditions. The WTRU may compare parameter values in assistance information (e.g., synchronization error and/or boresight directions of DL-RS). The WTRU may determine whether the conditions may be similar between training phase and inference phase.

The WTRU may compare synchronization error during training and/or inference phases. If a difference in synchronization error is greater than the configured threshold, then the WTRU may determine that the network implementation is not consistent. If the difference between the synchronization error is below or equal to the configured threshold, then the WTRU may determine that network implementation is consistent.

If the assistance information is provided during the training phase but not provided during the inference phase, the WTRU may determine that the assistance information is not consistent. The WTRU may receive, from the training entity, the boresight angle of a PRS used during training an AI/ML model. However, the WTRU may not receive the boresight angle during the inference phase. The WTRU may determine that implementations related to setting of boresight angles of PRS are not consistent between the training and inference phase.

The WTRU may determine to compare a range of implementation error (e.g., synchronization error and/or uncertainty in boresight direction of PRS) between the training phase or inference phase by comparing the maximum or minimum, and/or absolute value of the range.

The WTRU may receive association information from the network (e.g., LMF) periodically. The WTRU may receive configuration for periodicity of the delivery of association information from the LMF.

The WTRU may receive association information semi-persistently. The WTRU may be configured with a time window with start and/or end times, and/or duration (e.g., in terms of number of symbols, slots, and/or frames). The WTRU may receive, from the LMF, association information during the configured time window.

The WTRU may receive association information based on the request. The WTRU may send a request to the network for association information of a PRS configuration parameter (e.g., TRP ID(s) and/or frequency layer ID(s)). The WTRU may include a timestamp and/or range of time (e.g., range of timestamps) requesting for association information at a specific time and/or time duration, respectively.

The WTRU may receive association information when the network changes implementation. When the WTRU sends a request to the network for association information, the WTRU may receive a reply from the network indicating that the association information has not changed since the last time it was distributed.

The WTRU may send a request to the network to switch implementation to the requested timestamp. The WTRU may indicate PRS configurations (e.g., TRP) or assistance information that the WTRU prefers their implementations to switch to the implementations at the indicated timestamp. As the response for the request, the WTRU may receive ACK or NACK or association information, assistance information, and/or timestamp from the network where the received association information and/or assistance information may not be the same as the requested association information, assistance information and/or timestamp.

The WTRU may receive, from the network, association information based on an event. The WTRU may receive, from the network, association information based on at least one of the following events: mobility event (e.g., the WTRU moves to a new cell from the current cell); the network (e.g., LMF and/or gNB) changes its implementation; periodic event (e.g., the network sends association information periodically); a request from the WTRU; and/or the WTRU changes its connection state (e.g., changes from RRC_CONNECTED to INACTIVE, INACTIVE to RRC_CONNECTED, and/or RRC_CONNECTED to IDLE).

The WTRU may determine validity conditions of association information. The WTRU may receive, from the network or AI/ML model training entity, one or more of the following validity conditions for association information; area validity and/or time validity. In area validity, the WTRU may determine that PRS configurations in association information is valid within a configured area (e.g., cell, area which may consist of more than one cells). In time validity, the WTRU may determine that PRs configurations in association information is valid within a configured time. Therein, the WTRU may start a timer when the WTRU receives association information and/or based on the configured expiry time, the WTRU may determine whether association information is valid or not.

If association information becomes invalid (e.g., it does not satisfy the configured validity conditions), the WTRU may determine that no association information associated with the AI/ML model. Therefore, the WTRU may not compare training association information and inference association information. The WTRU may not determine that there is no consistency between the training phase and the inference phase.

The WTRU may determine to perform consistency check on network implementations and/or conditions by comparing association information during training and/or inference phases. Association information during training and/or inference phases are referred as the terms “first association information” and “second association information,” respectively.

The WTRU may determine that the first and second association information are fully consistent if their contents and timestamp match. For example, association information 812*a* and 812*b* sent by the LMF at T1 and T2 in FIG. 8 are fully consistent. Association information 912*a* and 912*b* sent by the LMF at T1 or T2 and T5 in FIG. 9 are fully consistent.

The first and second association information may include association information, assistance information and/or PRS configurations, network capability, network status, and/or associated IDs. The WTRU may determine partial consistency between the first and second association information if at least one of the following conditions is satisfied: if part of the content of the first and second association information overlap; and/or the content of the first and second association information are the same but their timestamps are different.

Association information 812*a* and 812*c*, sent by the LMF at T1 and T3, respectively, in FIG. 8 are partially consistent. Association information 812*a* and 812*e*, sent by the LMF at T1 and T5, respectively, in FIG. 8 are partially consistent due to unequal timestamp.

The WTRU may determine and/or report metrics for the degree of partial consistency. The degree of partial consistency may be determined by how much overlap exists between training association information and inference association information. For example, out of five TRPs provided in inference association information, two of them may match with the TRPs provided in training association information. Accordingly, the WTRU may report 0.4, obtained with 2/5, to the network.

The WTRU may determine no consistency between the first and second association information if no overlap between the content of first and second association information exists. If the first and second association information are fully consistent, the WTRU may determine to use the trained AI/ML model(s) to obtain inference (e.g., WTRU location).

If the first and second association information are partially consistent, the WTRU may determine to use the trained AI/ML model to obtain a feedback value composed of one or more inference value(s), and/or the difference in association information between the first and second association information (e.g., timestamp of the first association information used during data collection). The WTRU may report differences in the content of association information between training and inference phases. For example, the WTRU may include PRS configurations (e.g., TRP IDs) which are not included in the training association information.

If the first and second association information are partially consistent, the WTRU may determine to use PRS configurations that overlap and/or have the same timestamp. In FIG. 8, the WTRU may receive an AI/ML model trained with the association information provided at T1. The WTRU may receive a request 810*b* for inference from the network after T3. By comparing association information 812*a* and 812*c* provided at T1 and T3, respectively, the WTRU may use measurements obtained from TRP0, TRP1 and TRP3 to generate inference. If the WTRU uses TRP2 in addition to TRP0, TRP1, and TRP3, the WTRU may report to the network that TRP2, which is not part of training association information 812*c*, may also be used to obtain inference.

The WTRU may use only consistent association information (e.g., TRPs found in both training and inference association information) to obtain inference. The WTRU may include PRS configurations not found in the inference configuration. The WTRU may then report the included PRS configuration.

The WTRU may receive, during the data collection phase, association information from the network (e.g., LMF) indicating more than one set of TRPs associated with a timestamp associated with each set. During the inference phase, the WTRU may receive association information from the LMF. The association information may indicate that more than one set of TRPs may be associated with a timestamp for each set. The WTRU may determine to use the set of TRPs to generate inference based on at least one the following criteria: set(s) with the same TRPs as in the training phase; set(s) with the same TRPs and/or same timestamp as in the training phase; and/or TRPs with the same timestamp as in the training phase.

As provided herein, a TRP is an example of PRS configuration parameter. Any PRS and/or DL-RS configuration parameters (e.g., PRS resource ID) may be used interchangeably in the examples.

If the first and second association information are not consistent, the WTRU may determine to use a fallback method to obtain the feedback value (e.g., fallback to a configured radio access technology (RAT)-dependent positioning method (e.g., DL-TDOA)).

The WTRU may determine to use PRS configuration(s) with the same timestamp when comparing between network side additional conditions during data collection and inference phase. The WTRU may compare PRS configuration and association information to determine consistency. The WTRU may determine full, partial, or no consistency by comparing one or more of the following: training PRS configuration and inference PRS configuration; training association information and inference association information; training assistance information and inference assistance information.

The network may configure the WTRU to compare either PRS configuration, association information and/or assistance information, or combination of them. The WTRU may compare one of PRS configuration, association information and/or assistance information, or combination of them based on availability of information from the network and/or AI/ML model training entity.

The WTRU may obtain only assistance information from the training entity. In this case, the WTRU may compare assistance information during training and inference phase to determine consistency.

By comparing training PRS configuration and inference PRS configuration, the WTRU may determine whether the PRSs used during training and/or inference phases are similar. If similar PRSs are used to derive measurements during the inference phase, the WTRU may generate suitable inferences from the trained AI/ML model.

A PRS configuration may be associated with a timestamp. The timestamp may indicate that implementation associated with the PRS configuration may remain constant. A PRS configuration may not be associated with a timestamp. This may indicate that the PRS configuration is used during training phase and/or to be used for inference.

As shown in FIG. 4, a PRS configuration may comprise different levels of configurations. The WTRU may compare a subset of training and/or inference PRS configurations to check consistency. Examples of these subsets include, but are not limited to: global cell IDs; cell IDs; TRP IDs; and PRS resource IDs.

The WTRU may compare a timestamp associated with training and/or inference PRS configurations. The WTRU may be provided, by the network or AI/ML training server, with PRS configuration. The WTRU may also be provided, by the network, with association and/or assistance information.

The WTRU may determine full consistency if both association and/or assistance information and/or PRS configuration are fully consistent. Association information may be a subset of assistance information and/or PRS configurations. For example, the association information may comprise a group of TRPs that is a subset of the TRPs provided in the assistance information and/or PRS configurations. Additionally or alternatively, the association information may not be a subset of assistance information or PRS configurations. For example, the WTRU may be provided with a group of TRPs in association information which are not included in the list of TRPs provided in assistance information and/or PRS configurations.

Association information and/or assistance information may be equivalent. For example, the WTRU may receive a group of TRPs in association information which is the same set of TRPs provided in assistance information and/or PRS configurations. In this case, the WTRU may receive an indication from the network that association information and/or assistance information (and/or a subset of assistance information) and/or PRS configuration are equivalent. The WTRU may determine partial consistency if at least one of PRS configuration, association, and/or assistance information is fully consistent; and/or if at least one of PRS configuration, association, and/or assistance information is partially consistent. The WTRU may determine no consistency if neither PRS configuration, association, and/or assistance information is consistent; and/or if at least one of PRS configuration, association, and/or assistance information is not consistent.

The WTRU may determine consistency based on an indication sent by the network. For example, WTRU may determine network implementations are consistent if the WTRU receives an indication from the network that there is no change in network implementations (e.g., TRP locations and/or angles of antenna panels). The WTRU may receive such an indication from the network based on a request sent by the WTRU for the recent status of implementation. Herein, the terms "PRS configuration", "PRS configurations" and "assistance information" may be used interchangeably.

A WTRU may receive association information to perform performance monitoring of active and/or inactive AI/ML model(s). Herein, the term "association information" may include associated IDs. The WTRU may have an active function and/or model to generate inference. The WTRU may determine to activate a model or function based on the activation command received from the network (e.g., LPP, RRC, and/or MAC-CE). The activation command may include information about a function and/or model to be activated (e.g., functionality ID and/or model ID). The WTRU may deactivate a model and/or function based on the deactivation command received from the network. The deactivation command may include information about a function or model (e.g., functionality ID and/or model ID) to be deactivated.

A WTRU may use an active functionality and/or model(s) to generate inference. Inactive models and/or functionalities may be the models and/or functionalities which are trained but the WTRU does not use them to generate inference. A functionality may be associated with more than one models.

The WTRU may receive association information during AI/ML positioning. The WTRU may determine to continue and/or terminate AI/ML positioning, update models and/or functionalities and/or re-evaluate current active and/or inactive models based on the received association information.

The WTRU may have more than one inactive models and/or functionalities at the WTRU. The WTRU may activate one of the models and/or functionalities based on the performance monitoring and/or an indication from the network. The WTRU may report to the network the result of the consistency check.

The WTRU may receive a request from the network to perform consistency check while the WTRU generates inference using an active AI/ML models and/or functionality. The WTRU may perform a consistency check if at least one of the following conditions is satisfied: an error metric and/or a duration of elapsed time. An error metric (e.g., standard deviation, variance, mean square error) may be determined based on inference and/or ground truth (e.g., WTRU location obtained from the network, position referencing unit (PRU), via positioning method such as RAT-dependent and/or independent positioning method) being above a configured threshold. An elapsed time condition (e.g., absolute time, number of slots, and/or number of frames) refers to the last occasion of consistency check being above the configured threshold The WTRU may report, to the network, the result of consistency check per AI/ML model and/or functionality. For example, the WTRU may report to the network that the training association information and/or received association information (e.g., inference association information) are fully consistent. The WTRU may report to the network that there is no consistency between training association information and received association information. The WTRU may report to the network that there is partial consistency between training association information and received association information. The WTRU may report, if configured and/or requested, the degree of consistency to the network.

The WTRU may receive association information from the network during AI/ML positioning. The WTRU may send a request for association information to perform a consistency check. The WTRU may then compare association of the active model and/or functionality with the receive association. Based on the result of consistency check, the WTRU may perform performance monitoring.

If the WTRU determines full consistency between association information of the active model and/or functionality and the received association information, the WTRU may continue AI/ML positioning using the active model. The WTRU may perform performance monitoring at a configured timing (e.g., N slots or hours after the WTRU checks consistency) if the WTRU determines full consistency. If the WTRU determines full consistency between training association information for the active model and received association information, the WTRU may wait until the trigger or activation command, sent by the network, for performance monitoring.

Performance monitoring may consist of the following steps: first, the WTRU may request the network for the ground truth, measurements associated with the ground truth, and/or assistance information. Second, based on the received ground truth from the network, the WTRU may check performance of the inference of the active model with the ground truth where the WTRU may receive more than one pair of measurements and/or an associated ground truth. Third, the WTRU may report, to the network, the error metric (e.g., absolute error and/or mean square error) based on inference and/or the ground truth to the network. If the WTRU is configured, the WTRU may determine to deactivate the active model and/or functionality if the error metric is above a configured threshold. If the WTRU determines to deactivate the active model, the WTRU may determine a model, among inactive models. This determination may yield an inference whose error metric is below the threshold and/or yield the smallest error metric among the inactive models at the WTRU. Fourth, the WTRU may receive an indication from the network as to which model and/or functionality to use based on the reported error metric between inference and ground truth.

The WTRU may determine to activate more than one models, if activation criteria (e.g., the error metric between the ground truth and inference), generated by a model, is below a configured threshold.

The WTRU may receive measurements and/or associated ground truth periodically from the network and/or during a configured time window. The time window may be configured (e.g., via RRC and/or LPP), with start/end time, and/or duration. The window may be activated or deactivated by MAC-CE.

During performance monitoring, the WTRU may not report inference to the network as the active AI/ML model may not be reliable. If the WTRU determines partial consistency or no consistency between association information of the active model and/or functionality and/or received association information, the WTRU may perform performance monitoring. The WTRU may report the result of the consistency check to the network.

During the performance monitoring procedure, the WTRU may not report inference to the network. During the life cycle management (LCM) procedure, the WTRU may drop any scheduled transmission of uplink channels (e.g., PUCCH and/or PUSCH). Moreover, the WTRU may not receive scheduled transmission from the network (e.g., CSI-RS, physical downlink control channel (PDCCH), and/or physical downlink shared channel (PDSCH)).

The WTRU may be configured with a time window for performance monitoring. The WTRU may receive an activation and/or deactivation command to activate and/or deactivate the time window from the network. The network may configure the WTRU with start and/or end times of the time window or duration of the window. If the WTRU cannot determine the models and/or functionalities to activate by the end of the time window, the WTRU may report an error. Further, the WTRU may fall back to the fallback positioning method.

If the outcome of the comparison is partial or no consistency, the WTRU may determine to fall back to the fallback positioning method, report an error to the network with a cause (e.g., no consistency), and/or report to the network the result of the consistency check.

Further disclosed herein is a procedure for receiving association information (e.g., how often the WTRU may obtain association information from the network. While an AI/ML model is active at the WTRU, the WTRU may receive association information periodically from the network. Each time the WTRU receives association information, the WTRU may compare association information of the active model and/or functionality and/or received association information.

In The WTRU may be configured with a time window during which the WTRU performs performance monitoring. The WTRU may receive assistance information and/or association information for performance monitoring during the time window. The WTRU may receive, from the network, an activation and/or deactivation command to activate and/or deactivate the window respectively. The time window may have start or end time (e.g., SFN, slot index, and/or frame index), and/or duration (e.g., number of slots).

The WTRU may receive a request from the network to perform performance monitoring. The WTRU may send a request to the network to perform performance monitoring. The WTRU may receive assistance and/or associate information from the network as the response for the request.

The WTRU may receive, from the network, measurements, associated ground truth and association information from a PRU. In this case, the ground truth may be the location of the PRU. The PRU may make the measurements and/or report the measurements to the network. The WTRU may receive the measurements made by the PRU, ground truth, and/or association information based on the request from the WTRU. The WTRU may receive information related to AI/ML model(s) used at the PRU, (e.g., model ID and/or functionality ID). The WTRU may perform a consistency check between PRU's association information and the WTRU's association information.

The WTRU may use the PRU's measurements and/or associated ground truth based on the result of consistency check. If the WTRU determines that the PRU's association information and the WTRU's association information (e.g., training association information) are fully consistent, then the WTRU may use PRU's measurements and/or associated ground truth for performance monitoring. If the WTRU determines that PRU's association information and WTRU's association information are partially consistent, then the WTRU may determine to use PRU's measurements and/or associated ground truth for performance monitoring, if configured by the network and/or the degree of consistency is above a configured threshold. The WTRU may not use the PRU's measurements and/or associated ground truth for performance monitoring if PRU's association information and WTRU's association information are not consistent.

The WTRU may determine association information of the active and/or inactive model based on association information used to train the model during the training phase. The WTRU may determine association information for the active and/or inactive model based on association information used for retraining and/or retuning the model. Returning and/or retraining the model may be done using a smaller set of training data compared to the size of the dataset used during training. In the examples herein, the terms "configuration" and "preconfiguration" may be used interchangeably.

The WTRU may report an applicable functionality and/or model to the network to inform the network that the WTRU can generate inference (e.g., WTRU location) using an AI/ML model. The WTRU may have more than one AI/ML model and/or functionality. The WTRU may determine an applicable model or functionality for given assistance information or association information. The WTRU may determine to the applicable model or functionality based on the following criteria: a model and/or functionality is applicable if associated training association information and inference association match, satisfying full consistency; and a model and/or functionality with the highest metric for partial consistency, derived based on training association information and inference association, is the applicable model and/or functionality.

The WTRU may report applicable model or functionality to the network by reporting the model ID and/or applicable functionality ID and/or indicating that the WTRU has an applicable model or functionality.

The WTRU may be configured with an AI/ML based positioning method. This AI/ML based positioning configuration may be associated with another RAT dependent positioning method (e.g., DL-TDOA and/or DL-AoD). If the WTRU deactivates the AI/ML based positioning method, the WTRU may determine to fallback to the positioning method associated with the AI/ML based positioning method.

The WTRU may be configured with a fallback positioning method (e.g., RAT dependent positioning method, RAT independent positioning method such as GNSS). The WTRU may send a report indicating the change in WTRU condition. Examples of WTRU side conditions may be orientation, movement, location, hardware status (e.g., orientation of antenna panels at the WTRU), and/or software status. The WTRU may fallback to a configured fallback positioning method if the WTRU side condition changes. The WTRU may determine to use the fallback positioning method or report an error to the network if one or more conditions is satisfied. One such condition is that the WTRU may not receive training association and/or assistance information from the AI/ML model training entity. Another such condition is that the WTRU may send a request to the network for inference association information and/or assistance information, and/or the WTRU does not receive inference association information and/or inference assistance information from the network.

The WTRU may receive a trained AI/ML model (e.g., from an OTT server) with a first association information related to model training. The WTRU may receive a request for inference from the network (e.g., LMF). The WTRU may send a request (e.g., to the LMF) for a second association information related to inference. The WTRU may receive an RS configuration and/or the second association information related to inference.

The WTRU may determine the consistency between the first association information and the second association information. If the first and second association information are equivalent, then the WTRU may determine they are fully consistent. If the first and second association information indicate overlap in information, then the WTRU may determine they are partially consistent. If the first and second association information are completely different, then the WTRU may determine they are partially consistent.

The WTRU may determine a method to obtain feedback and/or a feedback value, based on the determined consistency between the first association information and the second association information. If the first and second association information are fully consistent, then the WTRU may determine to use the trained AI/ML model to obtain a feedback value composed of one or more inference value(s). If the first and second association information are partially consistent, then the WTRU may determine to use the trained AI/ML model to obtain a feedback value composed of one or more inference value(s). In this case, the WTRU may also use the difference in association information between the first and second association information (e.g., timestamp of the first association information used during data collection and/or content of the first association information that is not included in the second association information). If the first and second association information are not consistent, then the WTRU may determine to use a fallback method to obtain the feedback value (e.g., fallback to a configured RAT-dependent positioning method (e.g., DL-TDOA)). If the WTRU does not receive a first or a second association information, then the WTRU may determine to use a fallback method to obtain the feedback value (e.g., fallback to a configured RAT dependent positioning method (e.g., DL-TDOA)). The WTRU may report the feedback value obtained based on the determined consistency.

An explicit ID may be assigned to an association. More than one ID may be associated with a PRS configuration (e.g., frequency layer and/or TRP). The WTRU may determine consistency in network side additional conditions based on the associated IDs associated with a PRS configuration.

An associated ID may be a vendor ID. For example, a TRP in the PRS configuration may be associated with an associated ID, indicating a vendor ID. A group of TRPs may be associated with an associated ID. A frequency layer ID may be associated with more than one associated IDs, indicating TRPs associated with the frequency layer ID may consist of TRPs from more than one vendor. An associated ID may be a temporary ID. An associated ID may be locally and/or globally unique. The WTRU may determine the associated ID based on the configuration from the network. The WTRU may receive the associated ID via broadcast, groupcast, and/or unicast. The associated ID may be unique within a cell and/or area (e.g., consisting of more than one cells). There may be more than one associated Is if there are more than one vendor.

An associated ID may be network and/or operator ID. A cell may be associated with an associated ID. An area, consisting of more than one cells, may be associated with more than one associated IDs.

An associated ID may indicate details for implementation. For example, the associated ID of "1" may indicate antenna height, "5" may indicate height and/or tilt, and/or "10" may indicate height, tilt, and/or analogue beamforming). In the same example, if both TRP_A and TRP_B have an associated ID of "1", the WTRU may determine that both TRP_A and TRP_B have the same antenna height and/or same implementation indicated by "1".

The WTRU may use an associated ID to determine consistency. Frequency layer ID is associated with more than one associated IDs where an associated ID may be a temporary vendor ID (e.g., TRPs from different vendors use the same PRS frequency layer (e.g., component carrier)).

The WTRU may determine full consistency if the PRS frequency layer in the data configuration is associated with the same set of associated IDs as those associated with the PRS frequency layer in the inference configuration. The WTRU may determine partial consistency if the associated IDs associated with the PRS frequency layer in the inference configuration is a subset of the associated IDs associated with the PRS frequency layer in the data collection configuration. The WTRU may determine no consistency if there is no overlap between the associated IDs associated with the PRS frequency layer in the inference configuration and associated IDs associated with the PRS frequency layer in the data collection configuration.

The WTRU may receive an explicit associated ID in the DL-RS (e.g., PRS) configuration. For example, an associated ID may be associated with a PRS configuration parameter (e.g., frequency layer ID, TRP ID, PRS ID, PRS resource ID) and/or assistance information (e.g., area ID, PRS boresight direction).

An associated ID may be a temporary ID. For example, the associated ID may be valid within an area (e.g., cell, cells) but it may not be globally unique. For example, the same associated ID may be issued by the network in different cells. Thus, the WTRU may determine validity condition(s) for the associated ID from assistance information provided by the network. If an associated ID is valid within an area (e.g., consisting of multiple cells), the WTRU may determine that the associated is invalid when the WTRU moves out of the area. An area may be defined by more than one cell IDs, global cell IDs, and/or PLMN IDs.

The associated ID may have time validity. The WTRU may start a timer when the WTRU is configured with the associated ID. Once the timer reaches expiration time, the WTRU may determine that the associated ID is not valid. The associated ID may be associated with a validity time window indicated by start/end time and/or duration. The WTRU may determine that the associate ID is invalid outside of the window. If the associated ID is not valid, the WTRU may determine that the corresponding PRS configuration does not have an associated ID. In the examples herein, the terms "PRS configuration" and "assistance information" may be used interchangeably.

The WTRU may determine that a PRS configuration is associated with a range of associated IDs where the range may indicate minimum and/or maximum value of the associated ID. An associated ID may be defined in different categories. For example, an associated ID can indicate at least one of the following: spatial implementation (e.g., boresight direction); time-related implementation (e.g., network synchronization error); frequency-related implementation (e.g., frequency offset); and/or location related implementation (e.g., uncertainty in location of TRPs).

Each category of implementation may be defined by a type. For example, Type A associated ID may indicate a spatial implementation while Type B associated ID may indicate time-related implementation. A PRS configuration may be associated with more than one category of implementation. For example, a PRS frequency layer may be associated with associated IDs where each associated ID corresponds to spatial, time, and/or frequency related implementations.

Herein disclosed are methods and/or procedures for determination of consistency and/or corresponding WTRU behavior. For example, a first group of associated IDs may be associated with a PRS configuration (e.g., PRS frequency layer) used during data collection or training. A second group of associated IDs may be associated with a PRS configuration used to generate inference using the trained AI/ML model. The first and/or second group of associated IDs may be associated with the same PRS configuration (e.g., frequency layer ID). The first and/or second group of associated IDs may comprise one or more than one associated IDs.

The WTRU may determine full consistency if the first and second group of associated IDs are equivalent (e.g. completely overlap). In this case, the WTRU may report to the network that conditions are consistent and/or report the inference based on the inference PRS configuration.

The WTRU may determine partial consistency if there is an overlap between first and second group of associated IDs. For example, associated IDs in TRPs may not match between training phase and inference phase. In this case, the WTRU may use TRPs whose associated IDs match.

The WTRU may determine and/or report metrics for the degree of partial consistency. The degree of partial consistency may be determined by how much overlap exists between training association information and inference association information. For example, out of five TRPs provided in inference association information, two of them may match with the TRPs provided in training association information. Accordingly, the WTRU may report 0.4, obtained with 2/5, to the network.

The WTRU may generate inference based on a set of inference PRS configurations that are fully consistent with the training PRS configurations. The WTRU may use PRS configuration whose metrics for the degree of partial consistency is above the configured threshold. The WTRU may report PRS configurations which are partially consistent or not consistent, but used to derive inference, to the network.

The WTRU may determine no consistency if there is no overlap between the first and second group of associated IDs. In this case, there may be no match between associated IDs associated with PRS configurations during the training and inference phase.

If the PRS configuration has an associated ID from the training phase but the associated ID is invalid due to violation of validity conditions (e.g., area and/or time, etc.), the WTRU may determine that the corresponding PRS configuration is not consistent between training and inference phase.

The fallback behavior for solutions involving use of explicit IDs for association may be similar to the behavior discussed throughout this specification. The WTRU may be configured with an AI/ML based positioning method associated with another RAT-dependent positioning method (e.g., DL-TDOA and/or DL-AoD). If the WTRU deactivates the AI/ML based positioning method, the WTRU may fallback to the positioning method associated with the AI/ML based positioning method.

A model and/or functionality may be looked up to determine a specific inference associated ID. A model and/or functionality may be selected at inference time for a given associated ID in several different ways. For example, the model and/or functionality may be assigned a single associated ID. This model and/or functionality may be used for inference if the specified associated ID exactly matches the one assigned to the model and/or functionality. This method may be known as the "exact" look up method.

In another example, the model and/or functionality may be assigned multiple associated IDs. The model and/or functionality, therefore, may be used with any of the assigned IDs. The model and/or functionality may have been trained with a combination of dataset configurations, each with its own unique associated ID. In this case the model and/or functionality may be assigned a list of associated IDs. At the inference time, the model and/or functionality del may be used if the given associated ID is in the list of associated IDs assigned to the model and/or functionality. This method may be known as the "or" look up method.

The model and/or functionality may be trained with an association of TRPs (e.g., a list of TRP IDs). In this case, the model and/or functionality may be assigned with the list of TRPs used during the training of the model (e.g., a training TRP set). At the inference time, the specified association ID may indicate a list of TRPs used during the inference (e.g., an inference TRP set). In this case, the model and/or functionality may be used for inference if the size of the intersection of a training TRP set and the inference TRP set is larger than a specified minimum intersection. This method may be known as the "intersection" look up method.

Based on the presented invention, the WTRU may determine whether the trained AI/ML model is suitable for generating inference given the current state of network implementation. This determination may guarantee consistency in accuracy performance of the WTRU location estimated by the WTRU with its AI/ML model(s) and/or functionalities.

What is claimed is:

1. A wireless transmit/receive unit (WTRU) comprising a processor and memory, the processor and memory configured to:
- receive, from a server associated with a trained artificial intelligence/machine leaning (AI/ML) model, a first association information, wherein the first association information comprises a first set of positioning reference signal (PRS) configurations on which the AI/ML model has been trained;
- receive, from a network entity, a request for one or more inferences related to a location of the WTRU via the AI/ML model;
- send, to the network entity, a request for a second association information;
- receive the second association information, wherein the second association information comprises a second set of PRS configurations;
- determine, by comparing the first and the second association information, the consistency between the first and the second association information based on a number of PRS configurations of the first set of PRS configurations overlapping with a number of PRS configurations of the second set of PRS configurations;
- implement, based on the determined consistency between the first and the second association information, the trained AI/ML model to generate one or more inferences related to the location of the WTRU;
- determine a feedback value based on the one or more inferences related to the location of the WTRU; and
- send a report, wherein the report comprises the feedback value.

2. The WTRU of claim 1, wherein the first set of PRS configurations comprises a first set of transmit/reception points (TRPs) and the second set of PRS configurations comprises a second set of TRPs.

3. The WTRU of claim 2, wherein the processor and memory are further configured to:
- receive a timestamp associated with the first or the second association information.

4. The WTRU of claim 3, wherein the timestamp is updated by the network entity when a TRP is added or removed from the first or second sets of TRPs.

5. The WTRU of claim 1, wherein the processor and memory are further configured to:

determine that the consistency between the first and second association information is partially consistent based on a portion of the number of PRS configurations of the first set of PRS configurations overlapping with a portion of the number of PRS configurations of the second set of PRS configurations.

6. The WTRU of claim 1, wherein the processor and memory are further configured to:

determine that the consistency between the first and second association information is fully consistent based on each of the number of PRS configurations of the first set of PRS configurations overlapping with each of the number of PRS configurations of the second set of PRS configurations.

7. The WTRU of claim 1, wherein the processor and memory are further configured to:

determine that the consistency between the first and second association information are not consistent based on none of the number of PRS configurations of the first set of PRS configurations overlapping with the number of PRS configurations of the second set of PRS configurations.

8. The WTRU of claim 7, wherein the feedback value comprises a first feedback value, wherein the processor and memory are further configured to generate a second feedback value that is based on a fallback method that does not use the trained AI/ML model due to the first and second association information determined to be not consistent.

9. The WTRU of claim 1, wherein the processor and memory are further configured to:

receive, from the network, an instruction to perform a consistency check; and perform the consistency check between the first association information and the second association information based on the instruction.

10. The WTRU of claim 1, wherein the processor and memory are further configured to:

receive, from the server, the trained AI/ML model.

11. A method implemented by a wireless transmit/receive unit (WTRU), the method comprising:

receiving, from a server associated with a trained artificial intelligence/machine leaning (AI/ML) model, a first association information, wherein the first association information comprises a first set of positioning reference signal (PRS) configurations on which the AI/ML model has been trained;

receiving, from a network entity, a request for one or more inferences related to a location of the WTRU via the AI/ML model;

sending, to the network entity, a request for a second association information;

receiving the second association information, wherein the second association information comprises a second set of PRSs;

determining, by comparing the first and the second association information, the consistency between the first and the second association information based on a number of PRS configurations of the first set of PRS configurations overlapping with a number of PRS configurations of the second set of PRS configurations;

receiving, based on the determined consistency between the first and the second association information, from the trained AI/ML model, one or more inferences related to the location of the WTRU;

determining a feedback value based on the one or more inferences related to the location of the WTRU; and sending a report, wherein the report comprises the feedback value.

12. The method of claim 11, wherein the first set of PRS configurations comprises a first set of transmit/reception points (TRPs) and the second set of PRS configurations comprises a second set of TRPs.

13. The method of claim 12, the method further comprising:

receiving a timestamp associated with the first or the second association information.

14. The method of claim 13, wherein the timestamp is updated by the network entity when a TRP is added or removed from the first or second sets of TRPs.

15. The method of claim 11, further comprising determining that the consistency between the first and second association information is partially consistent based on a portion of the number of PRS configurations of the first set of PRS configurations overlapping with a portion of the number of PRS configurations of the second set of PRS configurations.

16. The method of claim 11, the method further comprising:

determining that the consistency between the first and second association information is fully consistent based on all of the number of PRS configurations of the first set of PRS configurations overlapping with all of the number of PRS configurations of the second set of PRS configurations.

17. The method of claim 11, the method further comprising:

determining that the consistency between the first and second association information are not consistent based on none of the number of PRS configurations of the first set of PRS configurations overlapping with the number of PRS configurations of the second set of PRS configurations.

18. The method of claim 17, wherein the feedback value comprises a first feedback value, the method further comprising generating a second feedback value that is based on a fallback method that does not use the trained AI/ML model due to the first and second association information determined to be not consistent.

19. The method of claim 11, the method further comprising:

receiving, from the network, an instruction to perform a consistency check; and performing the consistency check between the first association information and the second association information based on the instruction.

20. The method of claim 11, the method further comprising:

receiving, from the server, the trained AI/ML model.

* * * * *